United States Patent [19]

Mizuno et al.

[11] Patent Number: 5,608,891
[45] Date of Patent: Mar. 4, 1997

[54] RECORDING SYSTEM HAVING A REDUNDANT ARRAY OF STORAGE DEVICES AND HAVING READ AND WRITE CIRCUITS WITH MEMORY BUFFERS

[75] Inventors: Masahiro Mizuno; Shiro Ogura; Kazuhiko Ito, all of Kamakura, Japan

[73] Assignee: Mitsubishi Denki Kabushiki Kaisha, Tokyo, Japan

[21] Appl. No.: 634,140

[22] Filed: Apr. 19, 1996

Related U.S. Application Data

[63] Continuation of Ser. No. 132,170, Oct. 5, 1993, abandoned.

[30] Foreign Application Priority Data

Oct. 6, 1992 [JP] Japan .................................. 4-267364

[51] Int. Cl.[6] ........................................................ G06F 11/10
[52] U.S. Cl. ...................... 395/441; 395/440; 395/182.04
[58] Field of Search .................................... 345/440, 441, 345/182.04

[56] References Cited

U.S. PATENT DOCUMENTS 4,761,785  8/1988  Clark et al. ............................ 371/51.1
5,233,618  3/1990  Glider et al. .......................... 371/68.1
5,257,367  10/1993 Goodlander et al. .................... 395/600
5,390,187  2/1995  Stallmo ................................. 395/441

FOREIGN PATENT DOCUMENTS 0369707    5/1990   European Pat. Off. .
0485110    5/1992   European Pat. Off. .
0508441    10/1992  European Pat. Off. .
WO92/01988 2/1992   WIPO .
WO92/11595 7/1992   WIPO .

OTHER PUBLICATIONS

D. Patterson, G. Gibson & R. Katz "A Case For Redundant Arrays of Inexpensive Disks" Dec. 1987, U. of California.

*Primary Examiner*—Matthew M. Kim
*Assistant Examiner*—Kevin L. Ellis
*Attorney, Agent, or Firm*—Wolf, Greenfield & Sacks, P.C.

[57] ABSTRACT

A read unit 400 which governs reading of data and a write unit 500 which governs writing of data are located separately in a RAID unit 300 which controls array type magnetic disk units. To read data from magnetic disk units 800, a control circuit 600 uses the read unit 400 to read data through an HDD control unit 700. To write data, the control circuit 600 uses the write unit 500 to write data into the magnetic disk units 800. Since the read unit and write unit are provided separately, processing performance improves.

32 Claims, 30 Drawing Sheets

| HDD 0 | HDD 1 | HDD 2 | HDD 3 | HDD 4 |
|---|---|---|---|---|
| 0 | 1 | 2 | 3 | P |
| 5 | 6 | 7 | P | 4 |
| 10 | 11 | P | 8 | 9 |
| 15 | P | 12 | 13 | 14 |
| P | 16 | 17 | 18 | 19 |
| 20 | 21 | 22 | 23 | P |
| 25 | 26 | 27 | P | 24 |

Fig. 7

| | | | | |
|---|---|---|---|---|
| 0 | 4 | 8 | 11 | |
| 1 | 5 | 9 | 12 | P |
| 2 | 6 | 10 | 13 | |
| 3 | 7 | 11 | 14 | |

Fig. 8

TARGET FUNCTION
READ (FIFO → SCSI UNIT)
WRITE (FIFO → HDD)
STAND BY ON FIFO SEVERAL CLOCKS AFTER HDD READ OPERATION IS COMPLETE.

| HDD# | 1 | 2 | 3 | 4 | 5 |
|---|---|---|---|---|---|
| | 1 | 2 | 3 | 4 | P |
| | 6 | 7 | 8 | P | 5 |

| OPERATION | OPERATION START CONDITION |
|---|---|
| ① READ DATA ON DISKS #2-#4 INTO RD FIFOS. ACCESS THE DISKS IN PARALLEL. | • RD FIFOS #2-#4 MUST BE EMPTY (WITH NO UNOUTPUT DATA) AND WRITE ADDRESS MUST BE RESET. |
| ② TRANSFER DATA IN RD FIFOS TO CONTROLLER IN ORDER. DATA (2) → DATA (3) → DATA (4) | • THE READ OPERATION OF DATA ON THE DISKS #2-#4 IN ① MUST BE COMPLETE. |

Fig. 14

MOST BASIC WRITE OPERATION.
THE TARGET DISK AND PARITY DISK ARE REWRITTEN.
NEW PARITY IS GENERATED BY EXCLUSIVE ORING
OLD DATA, OLD PARITY, AND NEW DATA.

| HDD# | 1 | 2 | 3 | 4 | 5 |
|---|---|---|---|---|---|
|  |  | 1 | 2 | 3 | 4 | P |
|  | 6 | 7 | 8 | P | 5 |

| OPERATION | OPERATION START CONDITION |
|---|---|
| ① TRANSFER NEW DATA TO WRT FIFO #1 AND P GEN FIFO (PARITY GENERATION FIFO). | • WRT FIFO #1 MUST BE EMPTY (WITH NO UNOUTPUT DATA) AND WRITE ADDRESS MUST BE RESET.<br>• P GEN FIFO MUST BE EMPTY (WITH NO UNOUTPUT DATA) AND WRITE ADDRESS MUST BE RESET. |
| ② READ OLD DATA AT THE CORRESPONDING ADDRESS FROM HDD1 AND OLD PARITY FROM HDD5 (PARITY DISK) INTO RD FIFOS. | • RD FIFO #1 MUST BE EMPTY (WITH NO UNOUTPUT DATA) AND WRITE ADDRESS MUST BE RESET.<br>• RD FIFO #5 MUST BE EMPTY (WITH NO UNOUTPUT DATA) AND WRITE ADDRESS MUST BE RESET. |

| | | |
|---|---|---|
| ③ | GENERATE NEW PARITY BY EX-CLUSIVE ORING THE OLD DATA AND OLD PARITY READ INTO RD FIFOS IN ② AND THE NEW DATA READ INTO P GEN FIFO IN ①, AND INPUT THE NEW PARITY TO WRT FIFO #5. | • THE READ OPERATION IN ② MUST BE COMPLETE.<br>• THE TRANSFER OF THE NEW DATA TO P GEN FIFO IN ① MUST BE COMPLETE.<br>• WRT FIFO #5 MUST BE EMPTY (WITH NO UNOUTPUT DATA) AND WRITE ADDRESS MUST BE RESET. |
| ④ | WRITE THE NEW DATA INTO HDD1. | • THE TRANSFER OF THE NEW DATA TO WRT FIFO #1 IN ① MUST BE COMPLETE.<br>• THE READ OF THE OLD DATA IN ② MUST BE COMPLETE. |
| ⑤ | WRITE THE NEW PARITY INTO HDD5. | • ONE CYCLE (200 ns) OR MORE MUST ELAPSE AFTER GENERATION OF THE NEW PARITY IN ③ STARTS. (FIFO DOES NOT BECOME EMPTY BECAUSE PARITY GENERATION SPEED > HDD WRITE SPEED) |

Fig. 18

ALL DATA IN ONE PARITY GROUP IS REWRITTEN.
SINCE NEW PARITY IS GENERATED BY EXCLUSIVE ORING
NEW DATA IN FOUR BLOCKS, OLD DATA AND OLD PARITY
NEED NOT BE READ.

| HDD# | 1 | 2 | 3 | 4 | 5 |
|---|---|---|---|---|---|
| | 1 | 2 | 3 | 4 | P |
| | 6 | 7 | 8 | P | 5 |

| OPERATION | OPERATION START CONDITION |
|---|---|
| ① TRANSFER NEW DATA (1) TO WRT FIFO #1 AND P GEN FIFO (PARITY GENERATION FIFO). | • WRT FIFO #1 MUST BE EMPTY (WITH NO UNOUTPUT DATA) AND WRITE ADDRESS MUST BE RESET.<br>• P GEN FIFO MUST BE EMPTY (WITH NO UNOUTPUT DATA) AND WRITE ADDRESS MUST BE RESET. |
| ② TRANSFER NEW DATA (2) TO WRT FIFO #2. AT THE SAME TIME, NEW DATA (1) READ FROM P GEN FIFO AND NEW DATA (2) ARE EXCLUSIVE-ORED AND THE RESULT IS WRITTEN INTO P GEN FIFO STARTING AT THE TOP ADDRESS. | • WRT FIFO #2 MUST BE EMPTY (WITH NO UNOUTPUT DATA) AND WRITE ADDRESS MUST BE RESET.<br>• READ AND WRITE ADDRESSES OF P GEN FIFO MUST BE RESET. |

Fig. 21 (CONTINUED)

| | |
|---|---|
| ③ TRANSFER NEW DATA (3) TO WRT FIFO #3.<br>AT THE SAME TIME, THE DATA READ FROM P GEN FIFO AND NEW DATA (3) ARE EXCLUSIVE-ORED AND THE RESULT IS WRITTEN INTO P GEN FIFO STARTING AT THE TOP ADDRESS. | • WRT FIFO #3 MUST BE EMPTY (WITH NO UNOUTPUT DATA) AND WRITE ADDRESS MUST BE RESET.<br>• READ AND WRITE ADDRESSES OF GEN FIFO MUST BE RESET. |
| ④ TRANSFER NEW DATA (4) TO WRT FIFO #4.<br>AT THE SAME TIME, THE DATA READ FROM P GEN FIFO AND NEW DATA (4) ARE EXCLUSIVE-ORED AND THE RESULT IS WRITTEN INTO WRT FIFO #5 AS NEW PARITY. | • WRT FIFOS #4 AND #5 MUST BE EMPTY (WITH NO UNOUTPUT DATA) AND WRITE ADDRESS MUST BE RESET.<br>• READ ADDRESS OF P GEN FIFO MUST BE RESET. |
| ⑤ WRITE NEW DATA (1)-(4) INTO HDD1 -HDD4. | • TRANSFER OF NEW DATA TO WRT FIFOS MUST BE COMPLETE. (THE DATA IN WRT FIFOS MAY BE WRITTEN INTO HDDS IN ANY ORDER.) |
| ⑥ WRITE NEW PARITY INTO HDD5. | • THE WRITE OF NEW PARITY INTO WRT FIFO #5 IN ④ MUST BE COMPLETE. |

Fig. 22

PROGRAM
  VECTOR 0 ⟶           JMP TASK 0
  VECTOR 1 ⟶           JMP TASK 1
    .
    .
    .
  VECTOR 7 ⟶           JMP TASK 7

Fig. 27

| P | 0 | 1 | 2 | 3 |
|---|---|---|---|---|
| 4 | P | 5 | 6 | 7 |
| 8 | 9 | P | 10 | 11 |
| 12 | 13 | 14 | P | 15 |
| 16 | 17 | 18 | 19 | P |

Fig. 32 PRIOR ART

RECORDING SYSTEM HAVING A REDUNDANT ARRAY OF STORAGE DEVICES AND HAVING READ AND WRITE CIRCUITS WITH MEMORY BUFFERS This application is a continuation application Ser. No. 08/132,170, filed Oct. 5, 1993, now abandoned.

BACKGROUND OF THE INVENTION

1. Field of the Invention

This invention relates to an array type recording system which is a computer storage system and more particularly to improvements in performance and reliability of a disk drive system in which a number of disk units are arranged in an array type configuration.

2. Description of the Related Art

Various documents and patents for disk drive systems each consisting of a number of disk units arranged like an array have been published. One of the documents is a publication on a system which dramatically improves the reliability of data stored in mass storage from Berkeley college of California University. This paper "A Case for Redundant Arrays of Inexpensive Disks (RAID)," Proc, ACM SIGMOD Conf., Chicago, Ill., June 1988 classifies data reliability improvement systems into five levels ranging from a conventional mirror disk system to a block interleave parity system. These levels are outlined below:

RAID Level 1

A normal mirror (shadow) system which stores the same data in two groups of disk units. The RAID level 1 system has been generally used formerly with computer systems for which high reliability is required. However, large redundancy leads to high cost per unit capacity.

RAID Level 2

The hamming code format used with DRAM is applied. Data in a redundant group is stored on disks with bits interleaved. On the other hand, to enable 1-bit error correction, an ECC code is written onto a number of check disks (four check disks are required when the number of data disks is ten) per group, one group consisting of about 10 to 25 disk units. Redundancy is slightly large.

RAID Level 3

A parity disk is fixed for use and data is recorded on data disks in the group with bytes interleaved. Since the error location is found from ECC for each drive, only one parity disk is required. The RAID level 3 system is appropriate for synchronizing spindle rotation for high speed transfer.

RAID Level 4

A parity disk is fixed for use and data is recorded on data disks in the group with blocks interleaved. RAID level 4 differs from level 3 in interleave units. That is, because of recording in block units, the RAID level 4 system is more appropriate for the case in which an access to small data is often made.

RAID Level 5

Unlike level 3 or 4, the RAID level 5 system does not have a fixed parity disk and stripes parity data on component disks. Thus, at a write operation, load concentration on parity disks does not occur and 10 PS increases (the higher the write percentage, the more advantageous the RAID level 5 system is than RAID level 4). Both operating performance and capacity efficiency are good.

A conventional example of a redundant array type disk drive system is "Array Type Disk Drive System and Method" by Array Technology Corporation in U.S.A. disclosed in Japanese Patent Laid-Open No. Hei 2-236714, wherein the redundancy level and the number of logical units of component disk units viewed from the host computer can be selected.

The method of striping parity data is shown in Japanese Patent Laid-Open No. Sho 62-293355, "Data Protection Feature" by International Business Machines Corporation in U.S.A.

FIG. 28 is a block diagram of the array type disk drive system disclosed in Japanese Patent Laid-Open No. Hei 2-236714 mentioned above, for example. In the figure, numeral 2 is a host interface (I/F) serving as a buffer between a host computer (not shown) and an array controller, numeral 3 is a microprocessor which controls an array controller, numeral 4 is a memory, numeral 5 is an EOR engine which generates redundant data and restores data, numeral 6 is a common data bus which connects the host I/F 2, the microprocessor 3, the memory 4, and the EOR engine 5, and numeral 8 is a channel controller, a plurality of channel controllers being connected to the data bus 6. Numeral 9 is a disk unit and numeral 10 is a channel; each of the disk units 9 is connected via the corresponding channel 10 to the corresponding channel controller 8. Numeral 13 is an array controller which controls the disk units 9.

FIG. 29 is a drawing for illustrating generation of redundant data on RAID. As shown in FIG. 29, stored on one of five disks is redundant data (parity) of data on the other four disks. The parity is calculated by exclusive-ORing the data on the four disks. That is, the parity data on the parity disk P results from exclusive-ORing the data on disks 0 to 3. For example, if the data on disk 0 cannot be read due to some fault, providing such parity as redundant data enables the data on disk 0 to be restored. That is, the data resulting from exclusive-ORing the data on disks 1 to 3 and parity disk can be used to restore the data on disk 0.

Although the parity can be calculated by exclusive-ORing the data on the four disks as described above, alternatively the old data on the disk onto which new data is to be written and the current parity data stored on the parity disk may be read to exclusive-OH the three types of data, the new data, old data, and parity data, thereby providing new parity data. This method is described in conjunction with FIG. 30. For example, to attempt to record new data DN (2) on disk 2, first the old data is read as DO (2) from disk 2. At the same time, the current parity data DO (P) is read from the parity disk. Next, the three types of data, DN (2), DO (2), and DO (P), are exclusive-ORed to generate new parity data DN (P). Then, the new data DN (2) is recorded on disk 2. Last, the new parity data DN (P) is recorded on the parity disk.

Next, the operation of the disk drive system shown in FIG. 28 is described. In FIG. 28, the host computer (not shown) always writes and reads data via the host I/F 2 into and from the disk system. When data is stored, instructions and data from the host computer are temporarily stored in the buffer memory 4 via the data bus 6. When data is reproduced, data provided in the buffer memory 4 is transferred via the host I/F 2 to the host computer.

FIGS. 31A and 31B are an internal block diagram and an operation flowchart of the host I/F 2. In FIG. 31A, numeral 21 is an I/F protocol chip and numeral 22 is a microcomputer. The I/F protocol chip 21 is an interface chip to handle SCSI (small computer system interface) and the microcomputer 22 analyzes the contents of data received at the I/F protocol chip 21 and outputs the result to the array controller 13 shown in FIG. 28. As shown in the flowchart of FIG. 31B, the microcomputer 22 checks a given command for validity, then analyzes the contents of the command and makes address conversion from logical address to physical address according to the analysis result. Thus, the command validity check, command decode, and address conversion are executed sequentially. Since the time required is, for example, between 300 microseconds and 1 millisecond, even if, for example, performance of other hardware devices is improved, the data transfer speed cannot be substantially improved because performance of the microcomputer 22 in the host I/F 2 does not improve.

The operation at RAID level 5 is described in conjunction with FIGS. 28 and 32. The microprocessor 3 divides data stored in the memory 4 into data blocks and determines data write disk units and a redundant data write unit. At RAID level 5, old data in the data blocks into which new data is to be written is required to update redundant data, thus a read operation is executed before a write operation. Data is transferred between the memory 4 and the channel controllers 8 via the data bus. Redundant data is generated by the EOR engine in synchronization with the data transfer.

Assuming that a data block is set to 512 bytes, for example, when 1024-byte data is written, it is recorded in two blocks 16 and 17 and parity data P is also recorded, as shown in FIG. 32. Such a recording state is called striping.

This is described in detail. First, write data disk units 9a and 9b and a redundant data disk unit 9e are determined. Next, the EOR engine 5 is started under the control of the microprocessor 3 for sending an old data read command for redundant data calculation to the channel controllers 8a, 8b, and 8e to which the data disk units 9a and 9b and the redundant data disk unit 9e are connected. After completion of reading the old data in the data disk units 9a and 9b and the redundant data disk unit 9e, new data is written into the data disk units 9a and 9b and the new redundant data generated by the EOR engine is written into the redundant data disk unit 9e as instructed by the microprocessor 3. Then, the host computer (not shown) is informed that data write is complete. As described above, when data is written, a preread of old data is required to generate redundant data, prolonging the processing time.

When one data record is divided and recorded over two or more disks as shown in FIG. 32, the two or more disks must be accessed to access the data record, degrading performance.

Next, a data read is described. When a data read is instructed by the host computer, the microprocessor 3 calculates the data block and data disk unit where the target data is stored. For example, if the data is stored in the disk unit 9c, a read command is issued to the channel controller 8c to which the disk unit 9c is connected. Upon completion of reading the data in the disk unit 9c, the data is transferred to the memory 4 and the host computer is informed that the data read is complete.

Next, data recovery and data reconstruction on a standby disk when an error occurs are described. Data recovery is executed when it is becomes impossible to read data in the disk unit 9c, for example. When it is impossible to read data in the disk unit 9c, the microprocessor 3 reads data from all disk units in the redundant group containing the read data block and the EOR engine 5 restores the data in the data block where it is impossible to read data.

For example, assuming that the redundant group consists of disk units 9a, 9b, 9c, 9d, and 9e, data blocks are read from the disk units 9a, 9b, 9d, and 9e, the EOR engine 5 restores the data in the disk unit 9c, and the data is transferred to the memory 4. Then, the host computer is informed that data read is complete.

Thus, even if an error occurring in a disk unit makes it impossible to read data, data can be recovered, improving data reliability.

Data reconstruction is executed when it is becomes impossible to use the disk unit 9c, for example. In this case, the microprocessor 3 reads data from all disk units in the redundant group containing the data stored in the data unit 9c, the EOR engine 5 restores data in the disk unit 9c, and the restored data is reconstructed on a standby disk.

For example, assuming that the redundant group consists of disk units 9a, 9b, 9c, 9d, and 9e, data is read from the disk units 9a, 9b, 9d, and 9e, the EOR engine 5 restores the data in the disk unit 9c, and the restored data is written onto a standby disk for reconstructing the data in the disk unit 9c on the standby disk. Then, the unavailable disk unit 9c is replaced by the standby disk. Since the replacement operation is performed when the system is operating, the system performance degrades during the replacement processing.

Since the conventional array type disk drive system is configured as described above, a data preread is also required to generate redundant data when data is written in a normal operation, prolonging the processing time.

When replacement occurs on an alternate (standby) disk in disk unit replacement processing, furthermore the system performance is further degraded.

SUMMARY OF THE INVENTION

Accordingly, it is an object of the invention to provide array type recording systems in which the read processing time and write processing time are shortened.

To this end, according to the invention, there is provided a first array type recording system which divides a single circuit used for both a read and write in conventional systems into a write circuit and a read circuit, the array type recording system comprising:

(a) a plurality of media for recording data;

(b) a write circuit for writing data onto the recording media; and (c) a read circuit, being different from the write circuit, for reading data from the recording media.

According to the invention, there is provided a second array type recording system which includes first-in first-out buffers (FIFOs) corresponding to a plurality of recording media for temporarily storing data, the array type recording system comprising:

(a) a plurality of media for recording data; and (b) read/write means having first-in first-out buffers corresponding to the recording media on a one-to-one basis for reading/writing data from/onto the recording media through the first-in first-out buffers.

According to the invention, there is provided a third array type recording system wherein a dual port memory is located in an interface section, for example, and a plurality of command processing sections access data stored in the dual port memory through the ports of the dual port memory, the array type recording system comprising:

(a) a plurality of media for recording data;

(b) means for reading/writing data from/onto the recording media as requested; and (c) interface means for issuing a request to the read/write means, the interface means comprising:

(c1) a command input section which inputs commands from an external system;

(c2) a multiport memory which has a plurality of access ports and stores the commands input through the command input section; and (c3) a plurality of command processing sections in which processing for converting into a request sent to the read/write means from the commands stored in the multiport memory is divided among the plurality of command processing sections for accessing the commands through the access ports of the multiport memory and executing their allotted processing portions in parallel.

According to the invention, there is provided a fourth array type recording system which is characterized by allocation of redundant data when data is recorded on a plurality of recording media in a striping manner, wherein to write data continuously, data written at the top of the next redundant group is started at the recording medium where redundant data in the preceding redundant group has been written and proceeds in a predetermined direction and to read data continuously, the recording media are read in order in a predetermined direction, the array type recording system comprising:

(a) a plurality of media for recording data;
(b) write means for recording data and redundant data of the data on the recording media in a scattered manner; to write a plurality of continuous data entries, the write means writes them onto the recording media in order in predetermined direction and locates redundant data of the data entries on the recording media cyclically and starts writing data entries in the next group at the recording media where redundant data in the preceding redundant group has been written; and
(c) to continuously read a plurality of continuous data entries written by the write means, when reading data from one redundant group, read means for reading redundant data in the redundant group and ignoring it, then reading data on the recording media in order in a predetermined direction starting at the recording media where the redundant data has been read.

According to the invention, there is provided a fifth array type recording system wherein to read data recorded on recording media through first-in first-out buffers (FIFOs), recovery data is generated at the same time as data is read into the first-in first-out buffers, the array type recording system comprising:

(a) a plurality of media for recording data and redundant data thereof in a scattered manner; and
(b) means for reading data recorded on the recording media, the means comprising:
 (b1) first-in first-out buffers located corresponding to the recording media on a one-to-one basis for inputting data recorded on the recording media;
 (b2) a read control circuit for reading data recorded on the recording media through the first-in first-out buffers; and
 (b3) a recovery data generation circuit which generates recovery data to correct data read when data is read from the first-in first-out buffers by the read control circuit.

According to the invention, there is provided a sixth array type recording system wherein redundant data of write data is generated at the same time as data is written onto recording media through first-in first-out buffers (FIFOs), the array type recording system comprising:

(a) a plurality of media for recording data and redundant data thereof in a scattered manner; and
(b) means for writing data onto the recording media, the means comprising:
 (b1) first-in first-out buffers located corresponding to the recording media on a one-to-one basis for recording data on the plurality of recording media;
 (b2) a write control circuit for writing data onto the recording media through the first-in first-out buffers; and
 (b3) a redundant data generation circuit which generates redundant data of write data when data is written onto the recording media from the first-in first-out buffers by the write control circuit.

According to the invention, there is provided a seventh array type recording system wherein a data read circuit contains a circuit which transfers read data to a write circuit and the write circuit uses the transferred data to generate redundant data, the array type recording system comprising:

(a) a plurality of media for recording data and redundant data thereof in a scattered manner;
(b) means for reading data recorded on the recording media, the means comprising:
 (b1) first-in first-out buffers located corresponding to the recording media on a one-to-one basis for inputting data recorded on the plurality of recording media;
 (b2) a read control circuit for reading data and redundant data thereof recorded on the recording media through the first-in first-out buffers; and
 (b3) a circuit which transfers read data when data is read from the first-in first-out buffers by the read control circuit; and
(c) means for writing data onto the recording media, the means comprising:
 (c1) first-in first-out buffers located corresponding to the recording media on a one-to-one basis for recording data on the recording media;
 (c2) a write control circuit for writing data onto the recording media through the first-in first-out buffers; and
 (c3) a redundant data generation circuit which generates redundant data from the data transferred from the transfer circuit and write data when data is written onto the recording media from the first-in first-out buffers by the write control circuit.

According to the invention, there is provided an eighth array type recording system which includes first-in first-out buffers (FIFOs) and output means which can use the first-in first-out buffer to transfer any desired number of data entries stored in the first-in first-out buffer, the array type recording system comprising:

(a) a plurality of media for recording data;
(b) first-in first-out buffers located corresponding to the recording media;
(c) means for reading/writing data from/onto the recording media through the first-in first-output buffers; and
(d) output means for outputting data from the first-in first-out buffer by the read/write means and continuing to hold the output data to enable the same to be again output from the first-in first-out buffer.

According to the invention, there is provided a ninth array type recording system which includes a plurality of cache memories corresponding to a plurality of recording media although one cache memory is provided for a plurality of recording media in a conventional array type recording system, the array type recording system comprising:

(a) a plurality of media for recording data;
(b) cache memories located corresponding to the recording media for temporarily storing data read/written from/onto the recording media; and
(c) means for reading/writing data from/onto the recording media through the cache memories.

According to the invention, there is provided a tenth array type recording system wherein, for example, an interrupt is generated in response to a combination of processing completion reports of any number of recording units and the corresponding task is started in response to the interrupt, the array type recording system comprising:

(a) a plurality of media for recording data;
(b) a plurality of task means for issuing an access request to any desired number of recording media of the recording media;
(c) means for reporting access completion to the recording media accessed by the task means; and
(d) task start means being responsive to a combination of reports from the report means for selecting the corresponding task means among the task means and starting its task.

According to the invention, there is provided an eleventh array type recording system which is the third array type recording system which further includes a control bus connected to one of the access ports of the multiport memory, and a data bus connected to one of the access ports of the multiport memory.

According to the invention, there is provided a twelfth array type recording system which is the third array type recording system wherein the command processing sections include a command check circuit which checks command validity, a circuit which decodes commands, and a circuit which converts a logical address of a data store location into a physical address.

According to the invention, there is provided a thirteenth array type recording system which is the fourth array type recording system wherein the write means writes a plurality of blocks which are recording units onto one recording medium at a time.

According to the invention, there is provided a fourteenth array type recording system which is the fourth array type recording system wherein the read means reads a plurality of blocks which are recording units from one recording medium at a time.

According to the invention, there is provided a fifteenth array type recording system which is the eighth array type recording system wherein each of the first-in first-out buffers includes a memory which records data, a read counter which is incremented or decremented as instructed from an external system and outputs a data read address of the memory, and a write counter which is incremented each time data is written, and outputs a data write address.

According to the invention, there is provided a sixteenth array type recording system which is the first, second, third, fourth, fifth, sixth, seventh, eighth, ninth, or tenth array type recording system wherein the recording media are magnetic disks.

According to the invention, there is provided a seventeenth array type recording system which is the first, second, third, fourth, fifth, sixth, seventh, eighth, ninth, or tenth array type recording system wherein the recording media are magneto-optic disks.

In the first array type recording system, the data write circuit and the data read circuit are separate circuits and write operation and read operation are executed in parallel, thereby improving the processing performance of the array type recording system.

In the second array type recording system, the first-in first-out buffers are provided corresponding to recording media on a one-to-one basis and data processing corresponding to each recording medium is performed using its dedicated first-in first-out buffer, thereby performing high speed processing.

In the third array type recording system, the interface section is provided with the multiport memory and the command processing sections access the multiport memory at the same time, thus sequential processing formerly performed is executed in parallel, thereby enabling the interface section to perform processing at high speed.

In the fourth array type recording system, since data written by the write means, that is, striped data is placed spirally, the read means, when reading the data, can read the spirally located data continuously in order. Since the write means starts writing the next redundant group at the recording medium where redundant data in the preceding redundant group is located, the read means starts reading at the recording medium where the redundant data in the preceding redundant group exists to read data in a new redundant group. Therefore, by previously skipping or ignoring the redundant data in the preceding redundant group, the data in the next redundant group is read from the recording medium, thereby reading recording media cyclically in a predetermined direction, thereby reading data continuously.

For example, if an error occurs on a recording medium and an attempt is made to correct the data recorded on the recording medium, it is necessary to read data from recording media which normally operate for generating recovery data. In the fifth array type recording system, the data read from the normal recording media is recorded in input/output buffers. In synchronization with the transfer block of the data transferred last into the first-in first-out buffer, recovery data is generated using this last read data. That is, when the read control circuit reads data into the first-in first-out buffer from the recording media, the recovery data generation circuit generates recovery data in synchronization with the read, thereby already generating the recovery data when the data is read from the recording media. The time of further generating recovery data after all data is read as in conventional systems can be saved and recovery data generation can be executed at high speed.

To write data onto recording media, redundant data is generated and written. In the sixth array type recording system, when the write control circuit writes data onto the recording media, the redundant data generation circuit generates redundant data of the write data in synchronization with the transfer block of the write data last transferred to the first-in first-out buffer among the write data. Since the redundant data generation circuit generates redundant data at the same time as the write control circuit writes data, the extra time formerly required to generate redundant data from write data can be saved.

The seventh array type recording system is intended to solve a problem of generating new redundant data after old data is tenporarily read when data is written onto recording media. The system is provided with the transfer circuit which transfers data and redundant data read by the read control circuit to the write control circuit. At the same time as data is transferred by the transfer circuit, new redundant data is generated by using new write data. Therefore, the extra time formerly required to generate redundant data from old read data and new write data can be saved and so the redundant data generation time can be shortened.

In the eighth array type recording system, the output means can cause data to be output from the first-in first-out buffer any number of times. For example, when a write or read error occurs, the data in the first-in first-out buffer can be again transferred by the output means. Therefore, a write operation can be retried and in a read operation, read data can be retransferred.

In the ninth array type recording system, since the cache memories are provided for the recording media on a one-to-one basis, data can be accessed at high speed and each of the cache memories can be dedicated to its corresponding recording medium, eliminating the need for exclusive control used when a cache memory is used with a plurality of recording media.

In the tenth array type recording system, the task issuing a processing request for recording media is identified in response to a combination of completion reports from the report means, and the identified task is started. When processing is complete on all recording media processed according to the processing request, the task expecting the processing completion can be started automatically.

In the eleventh array type recording system, the control bus and data bus are connected to the access ports of the multiport memory. Therefore control signals and data can be processed in parallel.

In the twelfth array type recording system, the command processing sections include the command check circuit, command decode circuit, and logical-to-physical address converter. Therefore, a command validity check, command decode, and conversion of a logical address to a physical address can be executed in parallel.

In the thirteenth array type recording system, a plurality of blocks are written onto a single recording medium at a time, enabling an efficient write operation.

In the fourteenth array type recording system, a plurality of blocks are read from a single recording medium at a time, enabling an efficient read operation.

In the fifteenth array type recording system, the read counter is not only incremented, but also decremented. Therefore, data temporarily read and output can also be again output as instructed from the external system.

Since the sixteenth array type recording system uses magnetic recording media as recording media, a plurality of conventional magnetic disk units can be used.

Since the seventeenth array type recording system uses magneto-optic recording media as recording media, the system can be constructed with a large capacity and easy-to-carry recording media as compared with the system which uses a plurality of magnetic disk units.

BRIEF DESCRIPTION OF THE DRAWINGS

In the accompanying drawings:

FIG. 7 is a drawing showing a spiraling data array in the array type recording system according to the first embodiment of the invention;

FIG. 8 is a drawing showing a modification example of the spiraling data array in the array type recording system according to the first embodiment of the invention;

FIG. 13 is a schematic block diagram of the read unit and the write unit with magnetic disk units between;

FIG. 14 is a first drawing for illustrating a short read operation according to the first embodiment of the invention;

FIG. 17 is a first drawing for illustrating an 1-block write operation according to the first embodiment of the invention;

FIG. 18 is a second drawing for illustrating an 1-block write operation according to the first embodiment of the invention;

FIG. 21 is a first drawing for illustrating a group write operation according to the first embodiment of the invention;

FIG. 22 is a second drawing for illustrating a group write operation according to the first embodiment of the invention;

FIG. 27 is a drawing for illustrating interrupt vectors according to the first embodiment of the invention;

FIG. 32 is a drawing showing a conventional striping data array.

DESCRIPTION OF THE PREFERRED EMBODIMENTS

Embodiment 1

Figure 1:
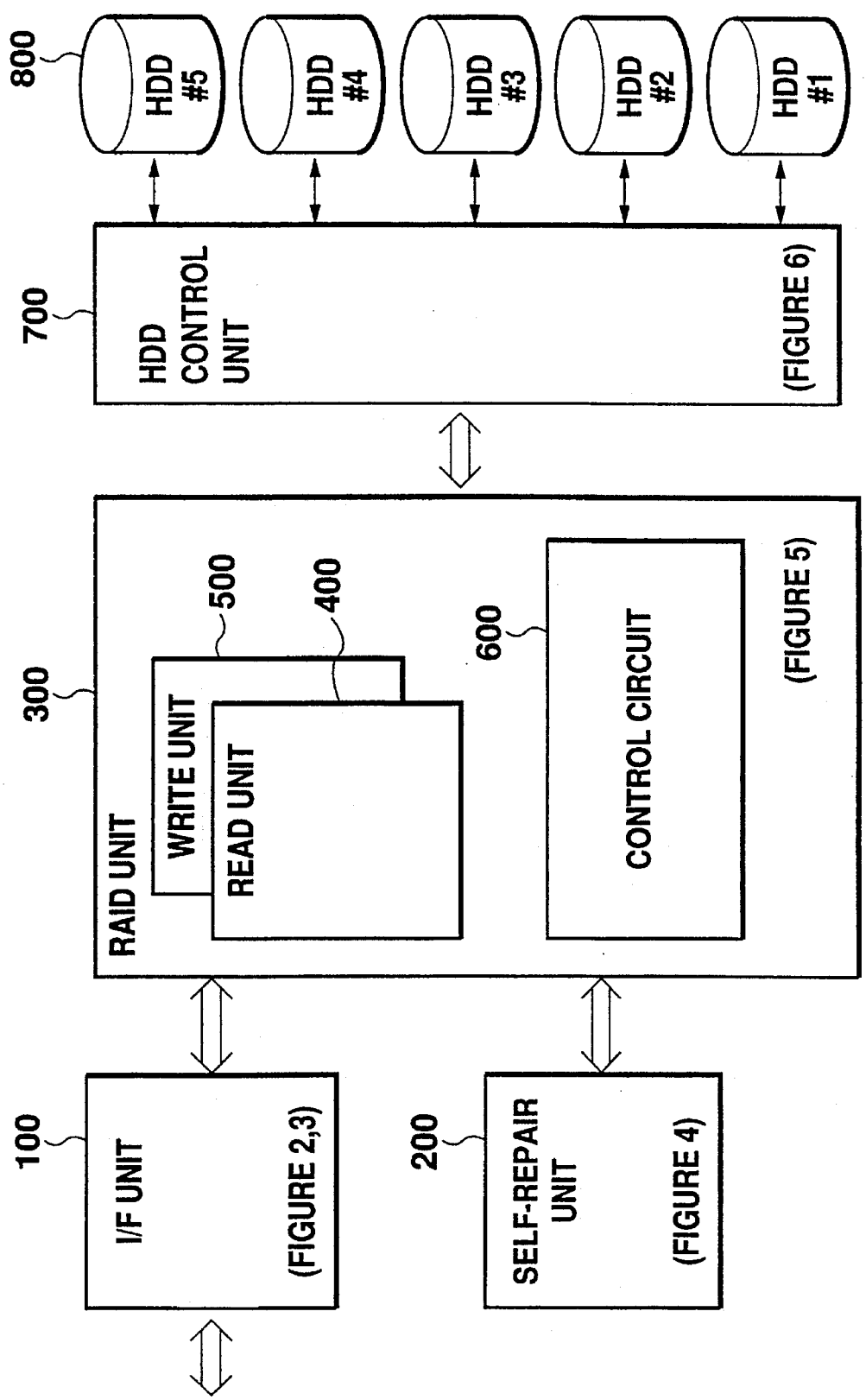
FIG. 1 is a block diagram of an array type recording system according to a first embodiment of the invention.

FIG. 1 is a block diagram of an array type recording system according to a first embodiment of the invention.

In the figure, numeral 100 is an interface unit, numeral 200 is a self-recovery unit, numeral 300 is a RAID unit, numeral 400 is a read unit contained in the RAID unit 300, numeral 500 is a write unit contained in the RAID unit 300, and numeral 600 is a control circuit which controls the entire RAID unit including the read unit 400 and the write unit 500. Numeral 700 is a magnetic disk unit control unit (HDD control unit) connected to the RAID unit 300. Numeral 800 is a magnetic disk unit.

Figure 2:
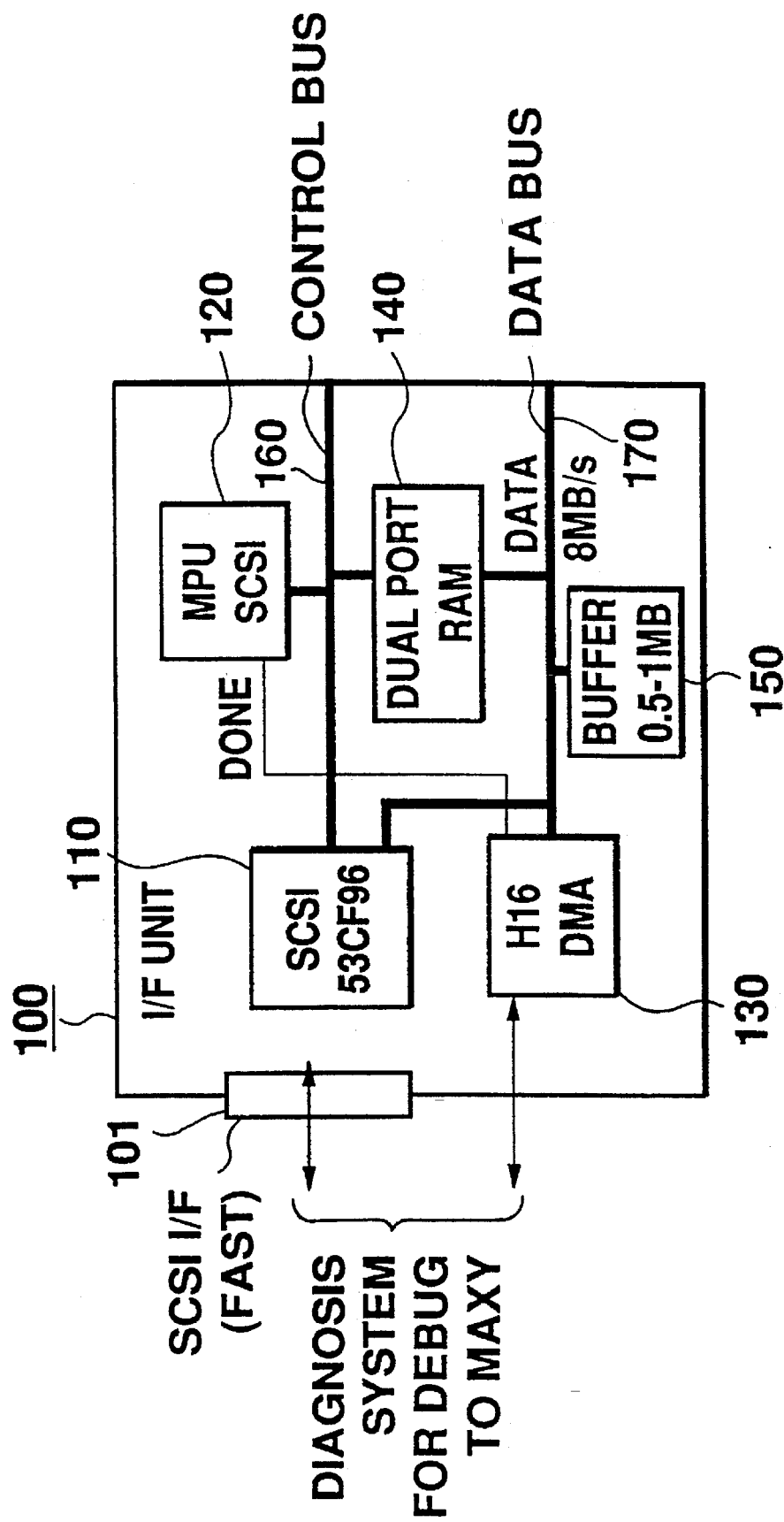
FIG. 2 is a block diagram of an interface unit of the array type recording system according to the first embodiment of the invention.
Figure 3:
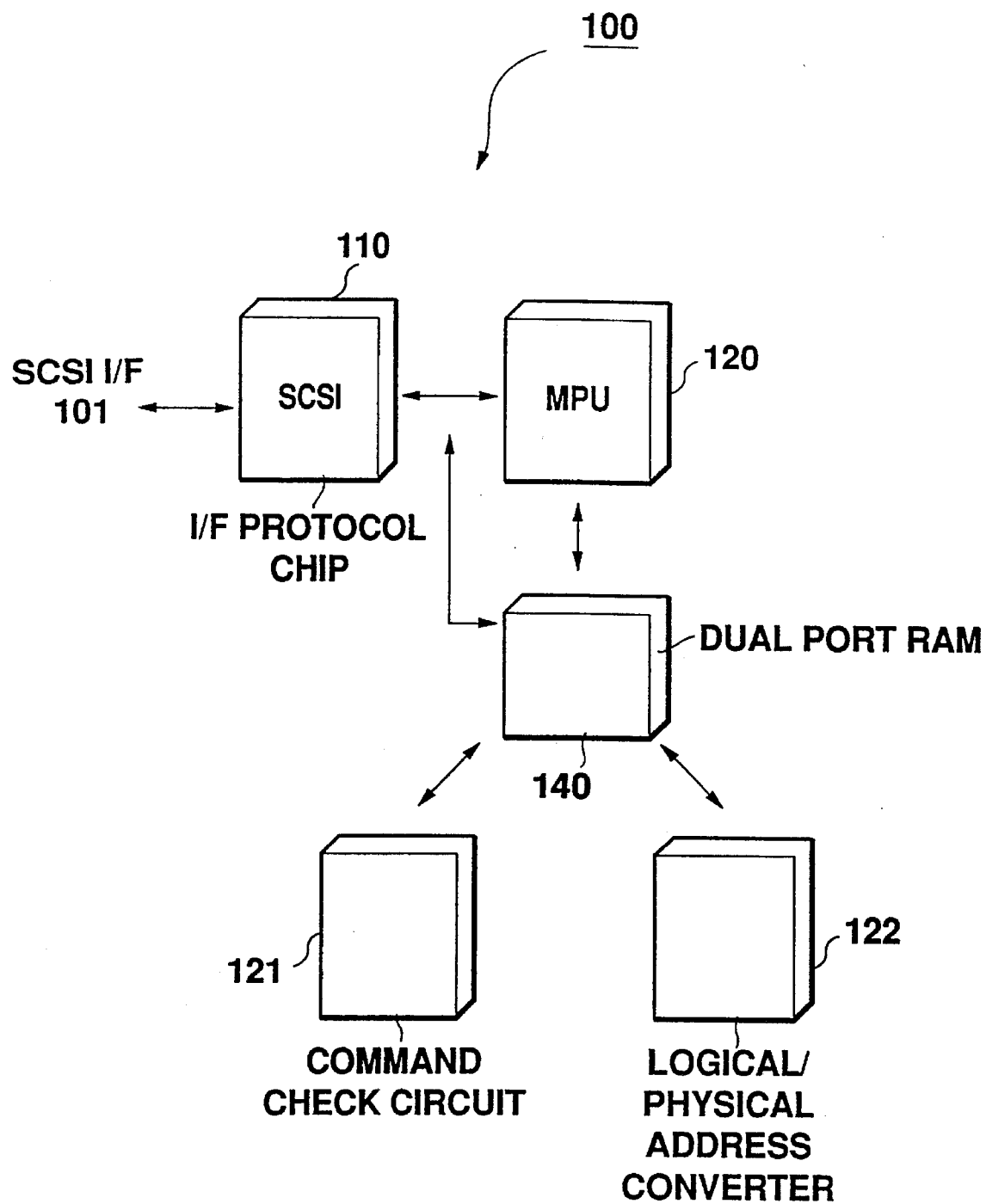
FIG. 3 is a block diagram of another type of interface unit of the array type recording system according to the first embodiment of the invention.

Next, the interface unit 100 is described in conjunction with FIGS. 2 and 3.

In FIG. 2, numeral 101 is a SCSI interface, numeral 110 is a SCSI chip which governs the SCSI interface, numeral 120 is a SCSI microprocessing unit (MPU) which analyzes a protocol input from the SCSI chip 110, numeral 130 is a DMA (direct memory access) chip which executes DMA transfer, numeral 140 is a dual port RAM (random access memory) having two access ports, numeral 150 is a buffer having a storage capacity of 0.5 to 1 megabytes, numeral 160 is a control bus connected to the SCSI chip 110, SCSI MPU 120, and dual port RAM 140. Numeral 170 is a data bus connected to the SCSI chip 110, DMA chip 130, dual port RAM 140, and buffer 150.

The dual port RAM 140 has two access ports, in the example, connected to the control bus 160 and the data bus 170. A processing request input via the SCSI interface 101 to the SCSI chip 110 is divided and output to the control bus 160 and the data bus 170 for processing. The SCSI chip 110 temporarily stores the processing request in the dual port RAM 140 and then the processing request stored in the dual port RAM 140 is accessed by the SCSI MPU 120 and the DMA chip 130. The SCSI MPU 120, for example, reads commands (CDB (command description block)) stored in the dual port RAM 140 via the control bus 160 and checks the commands for validity and decodes them. On the other hand, the DMA chip 130, for example, makes address conversion from logical address to physical address in order to get addresses required while the SCSI MPU 120 executes the command validity check and command decode.

The interface unit 100 is characterized by the fact that it has the separate control bus and data bus and that commands are temporarily stored in the dual port RAM 140, through the ports of which the processors access the commands stored in the dual port RAM 140 at the same time for executing command analysis and necessary conversion in parallel.

The buffer 150 is used when the length of the data to be transferred is long or to perform read modify write operation which reads data once from a magnetic disk unit, modifies it and then rewrites the resultant data into the magnetic disk unit.

The SCSI chip 110 and the DMA chip 130 can debug the connected RAID unit 300, etc., by interfacing with an external system and communicate with a diagnosis system operating in the host computer.

FIG. 3 is a block diagram of another example of the interface unit 100.

In FIG. 3, numeral 110 is a SCSI chip, numeral 120 is a microcomputer, numeral 121 is a command check circuit, numeral 122 is a logical-to-physical address converter, and numeral 140 is a dual port RAM.

In the example, the SCSI chip 110 stores commands (CDB) transferred from SCSI interface 101 in the dual port RAM 140. The microcomputer 120, the command check circuit 121, and the logical-to-physical address converter 122 can access the dual port RAM 140 at the same time.

Therefore, the command check circuit 121 checks the commands (CDB) in the dual port RAM 140 for validity. At the same time, the microcomputer 120 decodes the commands. Further, the logical-to-physical address converter 122 generates a physical address from an input logical address. The command check circuit 121 can be made of hardware or a microcomputer different from the microcomputer 120. Likewise, the logical-to-physical address converter can be made of appropriate hardware or a microcomputer different from the microcomputer 120.

Processing performed by the interface unit 100 is separated into three portions for systematic operation, thereby reducing overhead at the interface unit 100 and improving the processing speed of the array type disk drive system.

Figure 4:
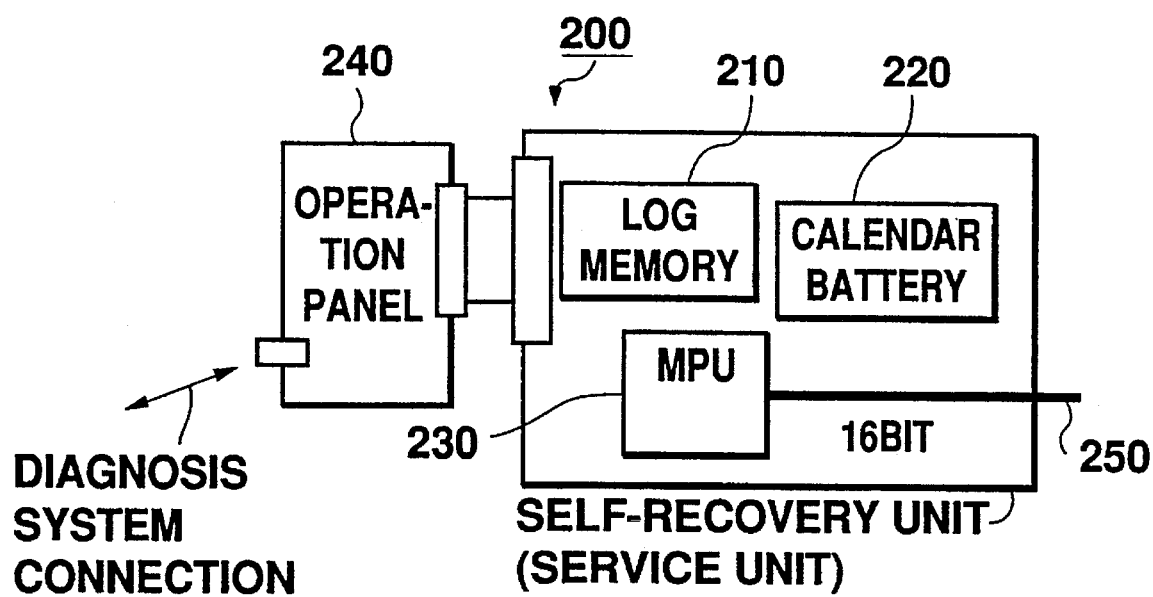
FIG. 4 is a block diagram of a self-recovery unit of the array type recording system according to the first embodiment of the invention.

FIG. 4 is a block diagram of the self-recovery unit 200 shown in FIG. 1.

In FIG. 4, numeral 210 is a log memory, numeral 220 is a calendar battery to retain a calendar of dates, time of day, etc., numeral 230 is an MPU which controls the self-recovery unit, and numeral 240 is an operation panel that can be installed as an option.

The operation panel 240 is provided with indicators such as a Ready LED and a Fault LED and also contains recovery or diagnosis software or a communication function for connecting a diagnosis system for online maintenance. The self-repair unit 200 contains a real-time clock (not shown) and also has the calendar battery 220 to retain a calendar of dates, time of day, etc., and can collect the operation state of the RAID unit 300 together with the date and time in the log memory 210. The MPU 230 always monitors the operation of the RAID unit 300 and collects its log data in the log memory 210. The MPU 230 also diagnoses the RAID unit 300 according to the diagnosis software installed in the operation panel 240. When a magnetic disk unit fails, recovery work is required to replace the disk unit with an alternative disk. The MPU 230 executes data recovery work on the alternate disk according to the recovery software contained in the operation panel 240 while competing with a processing request accepted by the interface unit 100. For the recovery work on the alternative disk, another disk unit which operates normally is usually fully read from top to end and recovery data is written onto the alternative disk. The MPU 230 executes the full read operation in the meantime when the interface unit 110 accepts a processing request from a higher-ranked device such as the host computer as usual.

Figure 5:
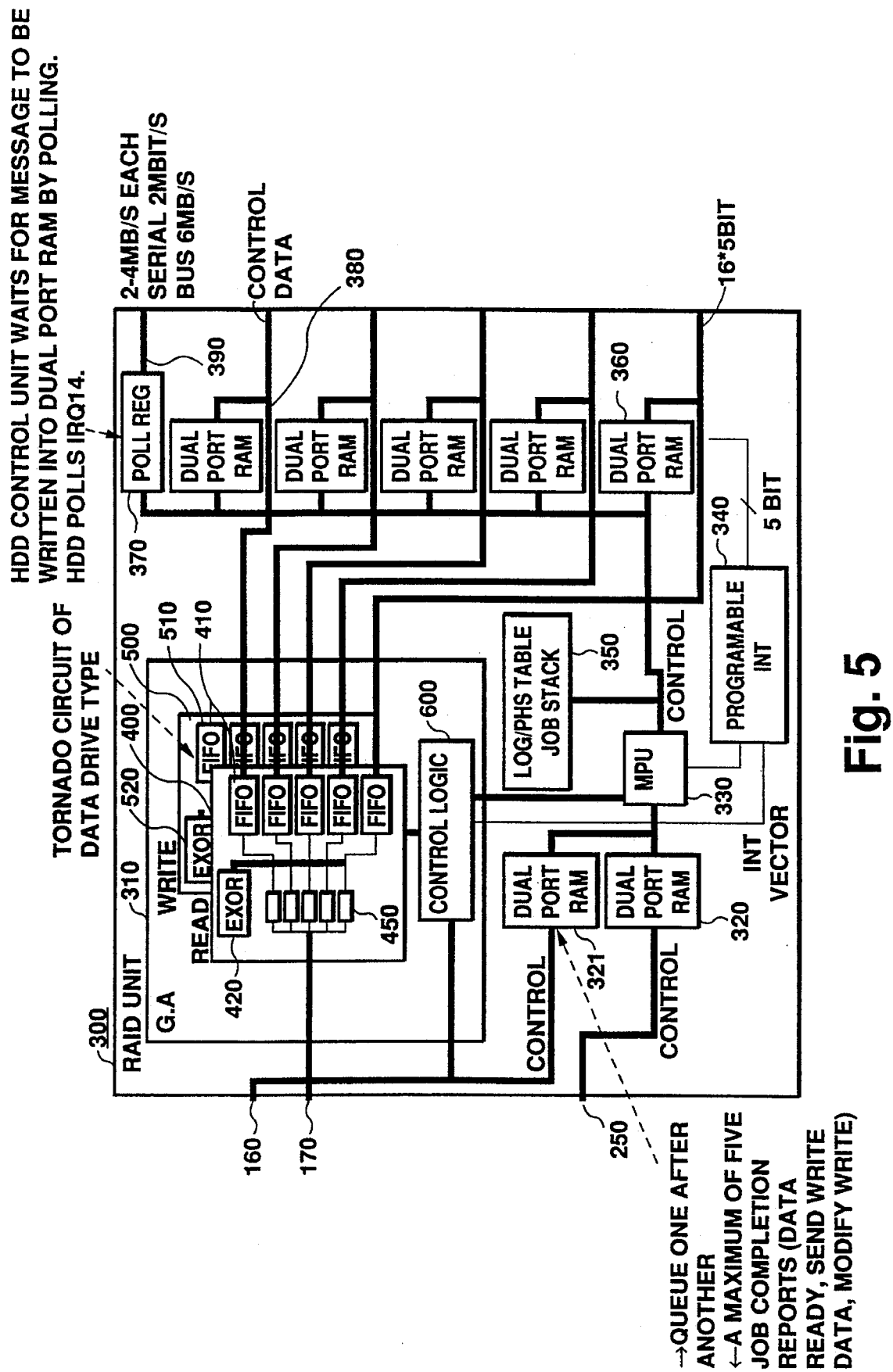
FIG. 5 is a block diagram of a RAID unit of the array type recording system according to the first embodiment of the invention.

FIG. 5 is a block diagram showing the detailed configuration of the RAID unit 300 shown in FIG. 1.

In FIG. 5, numeral 310 is a gate array which serves as the nucleus of the RAID unit 300, numeral 400 is a read unit installed in the gate array 310, numeral 500 is a write unit installed in the gate array 310, and numeral 600 is a control circuit. Numeral 410 is a FIFO installed in the read unit 400, numeral 420 is an exclusive OR circuit provided to generate redundant data, etc., and numeral 450 is a switch for connecting the data bus 170 and FIF0 410. Numeral 510 is a FIFO installed in the write unit 500 and numeral 520 is an exclusive OR circuit provided to generate redundant data, etc. Numeral 320 is a dual port RAM which stores control information of the MPU 230 of the self-recovery unit 200 shown in FIG. 4 and numeral 321 is a dual port RAM which stores control information from the control bus 160 of the interface unit 100 described above. Numeral 330 is an MPU which accesses data in the dual port RAMs 320 and 330 for communicating with the interface unit 100 and the self-recovery unit 200. Numeral 340 is an interrupt circuit which receives a completion notification of an access to a magnetic disk unit and generates an interrupt. Numeral 350 is a stack to hold requests processed by the MPU 330. Numeral 360 is dual port RAMs provided for magnetic disk units. Numeral 370 is a polling register for polling messages in the dual port RAMs 360 from the magnetic disk units.

The operation of the RAID unit 300 is described. The RAID unit 300 has the gate array 310 as the nucleus in which the read unit 400 and the write unit 500 are installed separately. The read unit 400 is a read circuit for reading data from a plurality of magnetic disk units and contains FIFOs 410 for recording read data from the magnetic disk units, the FIFOs corresponding to the magnetic disk units on a one-to-one basis. Likewise, the write unit 500 contains FIFOs 510 for writing data onto the magnetic disk units, the FIFOs corresponding to the magnetic disk units on a one-to-one basis. The FIFOs of the read unit 400 are selectively connected by the switch 450 to the data bus 170 from the interface unit 100. This also applies to the FIFOs of the write unit 500.

Next, the read unit operation and the write unit operation are described separately.

When a command to read data is transferred via the control bus 160 from the interface unit 100, the read request is sent to the control circuit 600, also called control logic. Likewise, the request is recorded in the dual port RAM 321. The control logic 600 causes the read unit 400 to operate. When receiving the message recorded in the dual port RAM 321, the MPU 330 judges that it is a read request, and writes the message into the dual port RAM 360 corresponding to the magnetic disk unit in which relevant data is recorded. The polling register 370 performs polling by acknowledging interrupt processing from a magnetic disk unit. The magnetic disk unit corresponding to the dual port RAM 360 into which the message is written by the MPU 330 transfers data via the bus 380 to the corresponding FIF0 410 of the read unit 400 in response to the message. The control logic 600 previously switches the switch 450 to place the FIF0 to which the magnetic disk unit transfers the data in the ready state. After the relevant data is read into the FIF0, the control logic 600 uses the data bus 170 to transfer the data to the interface unit 100.

On the other hand, when a request to write data is issued to the interface unit 100 from the host computer or the like, the interface unit 100 informs the control logic 600 and the dual port RAM 321 through the control bus 160 that a write request is received. The control logic 600 uses the data bus 170 to get the data related to the FIF0 corresponding to the magnetic disk unit into which data is to be written. The MPU 330 determines the corresponding magnetic disk unit according to the write request stored in the dual port RAM 321 and writes a message indicating that the write request is received into the related dual port RAM. When the magnetic disk unit is informed that a request to write into the magnetic disk unit is made by using the polling register, the magnetic disk unit uses the bus 380 to read and record data from the FIF0 410 corresponding to the magnetic disk unit.

Next, the control logic 600 is described. The control logic 600 controls the read unit 400 and the write unit 500 in response to requests received on the control bus 160 through the interface unit 100 from the host computer, etc. Particularly when the FIFOs of the read unit 400 and the write unit 500 are accessed, access patterns and modes are set. For example, 19 access patterns of the first to 19th are provided. The five modes of block read, block write, single read, single write, and recovery read are set, one of which is selected.

The dual port RAM 321 records disk access requests received on the control bus 160 through the interface unit 100 in sequence. On the other hand, the dual port RAM 321 has roles of receiving completion messages of the requests from the MPU 330, recording the request completion messages, and sending them via the control bus 160 to the interface unit 100. For example, if a read request is received through the interface unit 100, when read data is provided in the FIFO 410 and is ready to be transferred from the RAID unit 300 to the interface unit 100, the dual port RAM 321 is used to inform the interface unit 100 that the data is ready to be transferred. If a data write request is received through the interface unit 100, when the write unit 500 and the control logic 500 become ready, the dual port RAM 321 is used to transmit a request to send write data via the data bus 170 to the interface unit 100.

To perform a read write modify operation which modifies once read data and then are writes the resultant data, the dual port RAM 321 is used to request the interface unit 100 to perform the modify write operation.

Figure 6:
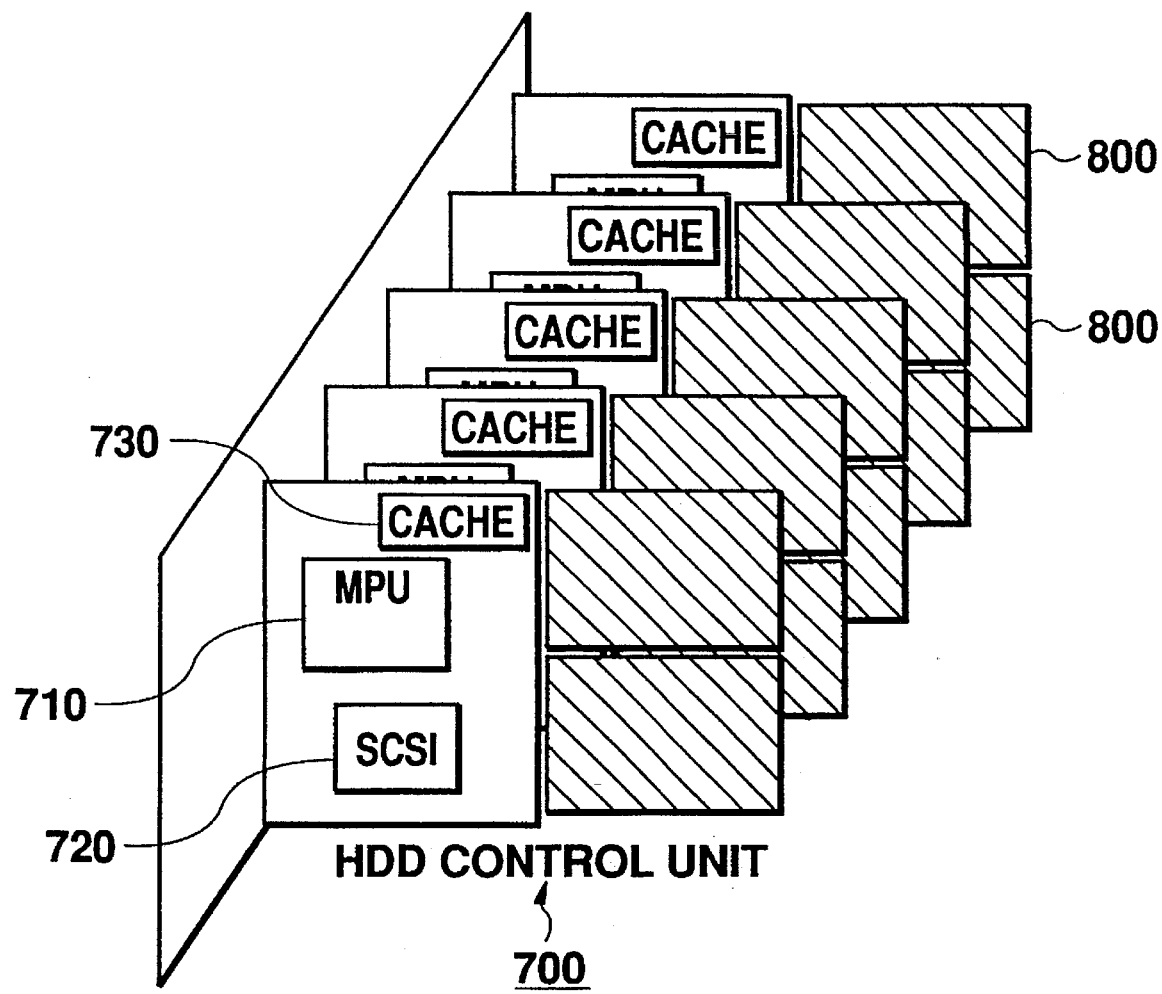
FIG. 6 is a block diagram of an HDD control unit and magnetic disk units 800 of the array type recording system according to the first embodiment of the invention.

Next, the configuration of the HDD control unit 700 and magnetic disk units 800 shown in FIG. 1 is described in conjunction with FIG. 6.

In FIG. 6, numeral 700 is the HDD control unit, numeral 710 is an MPU which governs control of the HDD control unit 700, numeral 720 is a SCSI chip used for the HDD control unit 700 to access a disk unit by using SCSI, and numeral 730 is a cache memory which temporarily stores data. Numeral 800 is a magnetic disk unit such as a 200-megabyte, 2.5-inch or 1-gigabyte, 3.5-inch magnetic disk unit.

As shown in the figure, the HDD control unit 700 consists of five control units, each of which contains the MPU 710, SCSI chip 720, and cache memory 730. The magnetic disk units 800 are connected to the corresponding control units. Although SCSI is used as the interface between the control unit and magnetic disk unit in the example, another interface such as IDE or PCMCIA may be used. In the example, two magnetic disk units are connected to one control unit, but three or four magnetic disk units may be connected to one control unit.

The MPU 710, which is located between the magnetic disk unit 800 and the RAID unit 300 described above, transfers data by string instructions, and can be dedicated to data transfer. The cache memory 730 is made of CAM (content addressable memory) and enables cache retrieval. Further, since the cache memory 730 is provided for each magnetic disk unit, cache retrieval can be made in parallel, enabling a high speed access. When only one cache memory is located and shared by a number of control units (magnetic disk units) as in the conventional disk drive system, what data is used by which control unit (magnetic disk unit) must be managed in the cache memory. The need for exclusive control in the cache memory is eliminated by providing the cache memory 730 for each control unit (magnetic disk unit).

Next, the read operation of the read unit and the write operation of the write unit shown in FIG. 5 are described by showing allocation of data in magnetic disk units. In FIG. 32 in the description of the prior art, the striping data array is described as a conventional data array. FIG. 7 shows a spiraling data array which is an improvement of the striping data array in order to lay out effective data to continuously handle data whose transfer length is long.

As shown in FIG. 32, to write data continuously in the striping data array, the data is written from left to right in the figure. That is, it is written into data blocks 0, 1, 2, 3 in order and its parity is written at the same time. After they are written as one redundant group, redundant data in the next redundant group is written by shifting write disks by one. Thus, the redundant group begins with data block 4, followed by redundant data, followed by data blocks 5, 6, 7. Thus, the redundant data is shifted slantwise from upper left to lower right in the figure for recording and at the same time, previous data is recorded left and subsequent data is recorded from left to right in order.

In contrast, in the spiraling data array, to write or read data blocks 0 to 24 as shown in FIG. 7, magnetic disk units 0 (HDD0) to 4 (HDD4) can be read or written in order. That is, to read data blocks 0 to 4, HDD0 to HDD4 are read in order; to read data blocks 5 to 9, again HDD0 to HDD4 may be read in order. Likewise, to read data blocks 10 to 14, HDD0 to HDD4 may be read in order. However, as shown in FIG. 7, when data block 3 is read, redundant data P must be read from HDD4 at the same time in an idle read. Thus, redundant data P is idly read or ignored at the same time as the last data in the redundant group is read, thereby enabling continuous data to be obtained simply by reading the magnetic disk units spirally in order.

The spiraling data array can be provided, when the write unit 500 writes data, by placing redundant data P in a number of magnetic disk units cyclically and beginning with the top data of the write of the next redundant group at the magnetic disk unit into which the redundant data in the preceding redundant group has been written. When data is read from the spiraling data array by the read unit 400, when the last data in one redundant group is read, the redundant data in the redundant group is also read at the same time and is ignored and the top data in the next redundant group is read from the magnetic disk unit where the redundant data in that redundant group has been read.

Next, a modification example of the spiraling data array shown in FIG. 7 is described in conjunction with FIG. 8.

In FIG. 7, one redundant group consists of one data block, in which case the spiraling depth is one. In FIG. 8, an example where the spiraling depth is four is discussed. Assume that the spiraling depth 4 means that four continuous logical addresses (data blocks) in one magnetic disk unit are read/written consecutively. Therefore, as shown in FIG. 8, data blocks 0 to 3 are recorded in HDD0 and data blocks 4 to 7 are recorded in HDD1. Likewise, data blocks 8 to 11 are recorded in HDD2. Thus, data blocks 0 to 14 are recorded in the magnetic disk units and redundant data P as much as the spiraling depth 4 is generated and recorded in HDD4. Although not shown in FIG. 8, when the next redundant group is recorded, redundant data P is recorded in HDD3 as shown in FIG. 7, and when the redundant group after that is recorded, redundant data P is recorded in HDD2; redundant data P is recorded cyclically as shown in FIG. 7.

An access to logical addresses 2 to 5 (data blocks 2 to 5) in the state as shown in FIG. 8 is described. To read logical addresses 2–5 (data blocks 2–5), data in HDD0 and HDD1 is read and transferred to the FIFO of the read unit of the gate array 310. To transfer data from the FIFO 410 of the read unit 400 to the interface unit 100, the data at logical addresses 0 and 1 is discarded and the data at the remaining logical addresses 2 and 3 is transferred. Likewise, the data at logical addresses 4 and 5 among the data at logical addresses 4 to 7 read from HDD1 is transferred to the interface unit 100 and the data at logical addresses 6 and 7 is not transferred to the interface unit 100 and is instead discarded.

Next, a write of data into logical addresses 2–5 is described. First, data at logical addresses 0–3 and 4–7 is read from HDD0 and HDD1 and expanded in the FIFO. Write data transferred through the interface unit 100 is shifted and overlapped on the FIFO data. That is, the data at logical addresses 2 to 5 contained in the FIFO is replaced by the write data at that time. Then, the data in the FIFO is written into HDD0 and HDD1. That is, the data at logical addresses 0–3 is written into HDD0 and the data at logical addresses 4–7 is written into HDD1.

Figure 9:
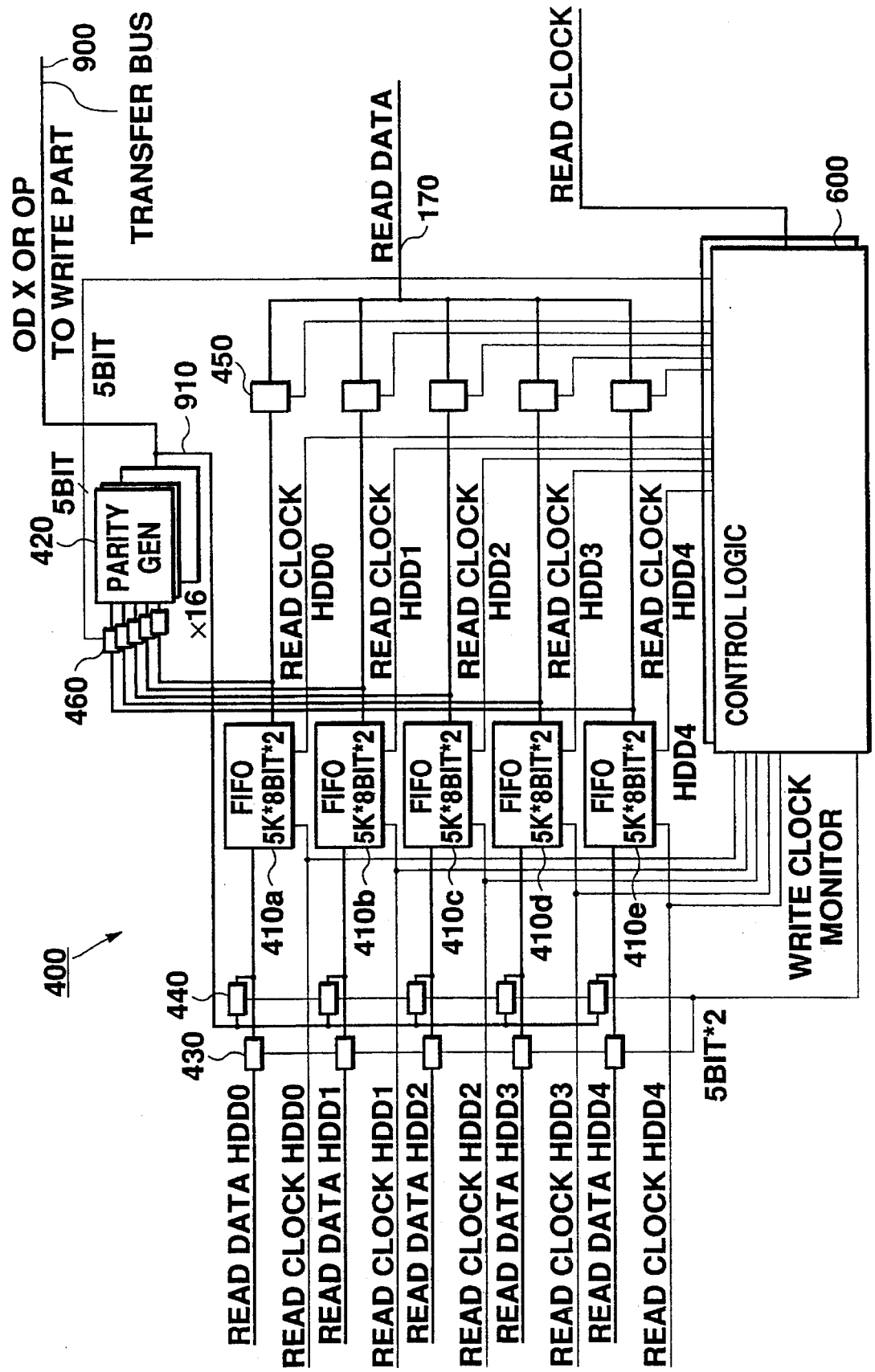
FIG. 9 is a block diagram of a read unit of the array type recording system according to the first embodiment of the invention.

Next, the read unit 400 is described in detail in conjunction with FIG. 9. In FIG. 9, numeral 410 is data first-in first-out (FIFO), numeral 420 is an exclusive OR circuit which generates redundant data, numeral 430 is a switch for connection and disconnection of the bus 380 extending from magnetic disk units (not shown) to the FIFO 410, numeral 440 is a switch for connecting redundant data, etc., output from the exclusive OR circuit 420 to the FIFO, and numeral 450 is a switch for connecting the FIFO 410 to the data bus 170 of the interface unit 100. Numeral 460 is a switch for connecting the FIFO 410 to the exclusive OR circuit 420. Numerals 900 and 910 are transfer buses for outputting the operation results of the exclusive OR circuit 420. Numeral 600 is a control circuit.

The control circuit 600 executes a read operation by switching the switches 430, 440, 450, 460 according to an access pattern and mode. It also monitors a clock to write data into the FIFO 410 and supplies a clock to read data from the FIFO 410. The control circuit 600 contains a sequencer (not shown) which stores a spiraling data array as shown in FIG. 7 as a spiraling table. It references the spiraling table to determine the magnetic disk units for reading/writing. The spiraling table also stores the spiraling depth as shown in FIG. 8, and the control circuit 600 references the spiraling depth for operation.

Read/write operation can also be performed based on an array other than the spiraling data arrays as shown in FIGS. 7 and 8 by changing the spiraling table. For example, instances corresponding to RAID level 5 are given in FIGS. 7 and 8, but the general striping data array corresponding to RAID level 5 as shown in FIG. 32 may be handled or an array corresponding to RAID level 4 may be stored.

Next, a read operation is described in conjunction with FIG. 9.

First, a continuous data read using the array as shown in FIG. 7 is discussed.

To read data continuously, data block 0 read from HDD0 is input to FIFO 410a and data in data block 1 read from HDD1 is read into FIFO 410b. Likewise, data from HDD2 and data from HDD3 are read into FIFOs 410c and 410d. When data is read into FIFO 410d, redundant data P from HDD4 is also read into FIFO 410e. The control circuit 600 transfers the data in data blocks 0–3 among the data read into FIFOs 410a–410d to the data bus 170 by switching the switches 450 in order. Next, data in data block 4 is read from HDD4 into FIFO 410e and data in data blocks 5–7 is read into FIFOs 410a–410c. When data is read into FIFO 410c, redundant data P is read from HDD3 into FIFO 410d. When the second redundant group is read into the FIFOs 410 in such a manner, the control circuit 600 again transfers data in data blocks 4–7 to the data bus 170 in order by switching the switches 450. The redundant data read into FIFO 410d is ignored.

Next, the operation of the exclusive OR circuit is described. For example, if data read from HDD0 is erroneous and data cannot be read normally, the data in HDD0 can be restored by reading data in HDD1–HDD4. In this case, the data in the redundant group to which the erroneous data in HDD0 belongs is read into FIFOs 410b–410e. The data read into FIFOs 410b–410e is also input via switches 460 to the exclusive OR circuit 420.

Figure 10:
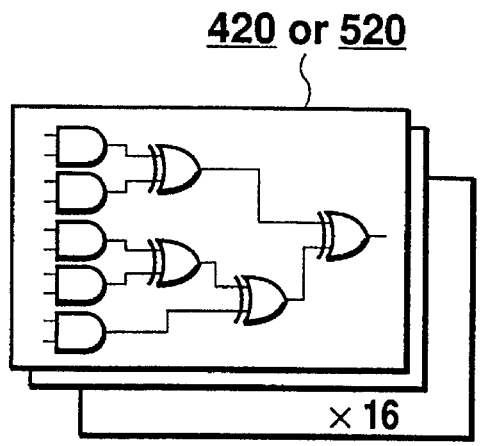
FIG. 10 is a circuit diagram of an exclusive OR circuit of the array type recording system according to the first embodiment of the invention.

FIG. 10 is a circuit diagram of the exclusive OR circuit 420.

Outputs of FIFOs 410a–410e are input to five AND gates and then five signals are exclusive-ORed by exclusive OR elements. Since data in HDD1–HDD4 is input to FIFOs 410b–410e in the example, the switch 460 corresponding to HDD0 is turned off and the switches 460 corresponding to the remaining HDDs or HDD1–HDD4 are turned on, inputting the data to the exclusive OR circuit 420. The exclusive OR circuit 420 exclusive-ORs the data in HDD1–HDD4 and outputs the result to the transfer bus 910. The control circuit 600 turns on the switch 440 corresponding to HDD0, thereby generating correct data in FIFO 410a. The switches 440 corresponding to HDD1–HDD4 remain off. At the same time as the data in HDD1–HDD4 is read into the FIFOs, the exclusive OR circuit generates correct or recovery data for each bit and writes it into FIFO 410a, thus the recovery data is generated in FIFO 410a in synchronization with the transfer block of the last transferred read data in HDD1–HDD4. The time formerly required for temporarily reading data in HDD1–HDD4 into memory and then generating recovery data by using the data stored in the memory can be saved.

Figure 11:
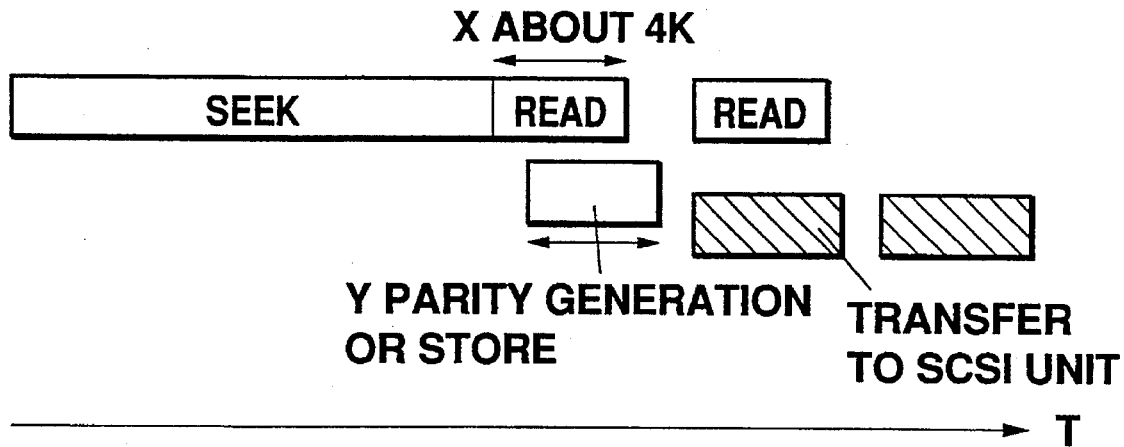
FIG. 11 is a drawing showing the timing for generating recovery data in the first embodiment of the invention.

FIG. 11 is a drawing showing the time relationship for generating the recovery data.

In the figure, T represents elapse of time. To read data, first, a seek operation is performed at disk units by a read instruction, then data is read by taking time X as shown in FIG. 11. Assume that the time required for reading the data in HDD1–HDD4 is X. Since the exclusive OR circuit 420 as shown in FIG. 10 is contained, the time Y shown in FIG. 11 is required to recover HDD0. The difference between the end points of the time X and the time Y is about the time required for the exclusive OR circuit 420 to operate, that is, element operation delay time in an ideal case.

Figure 12:
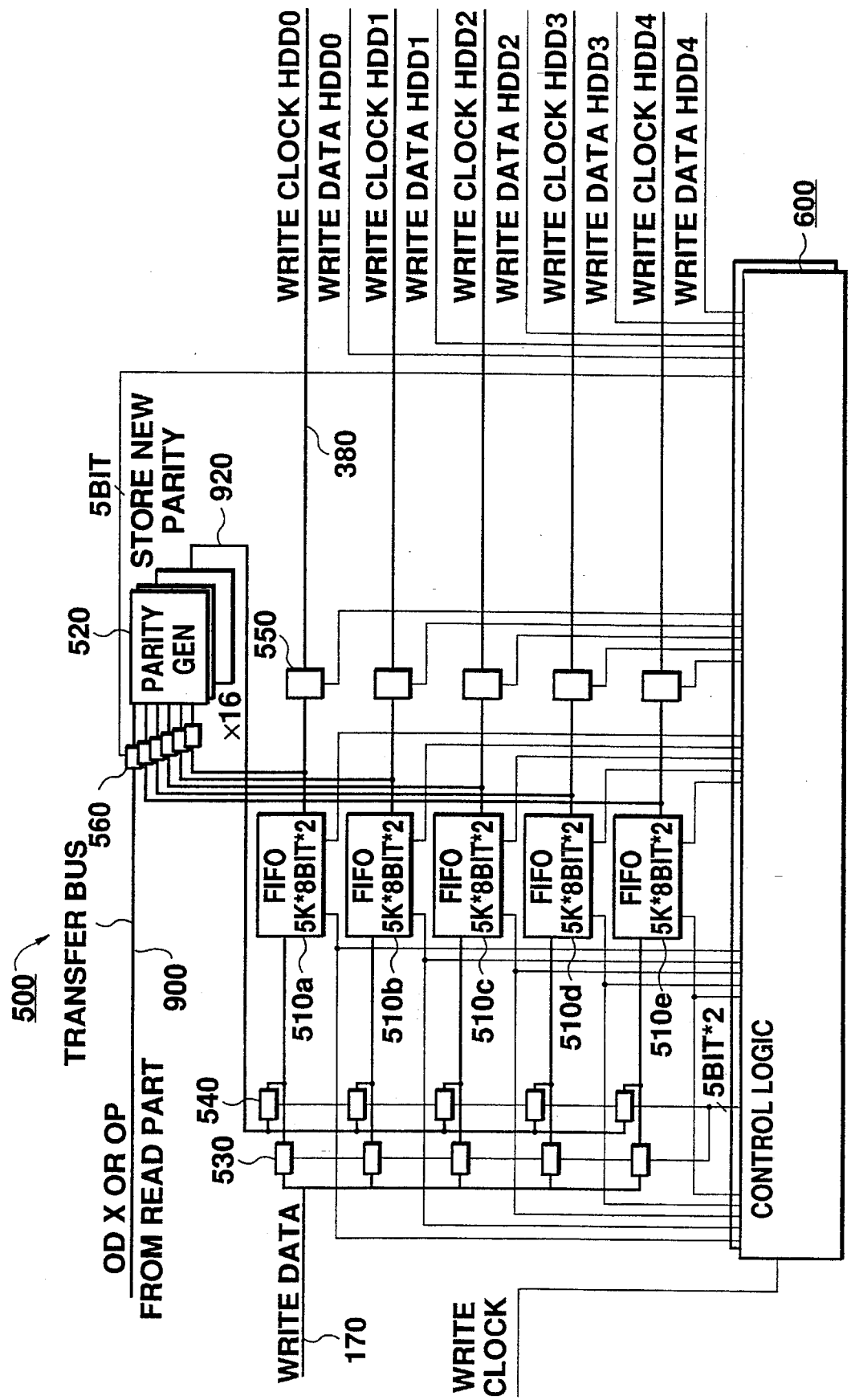
FIG. 12 is a block diagram of a write unit of the array type recording system according to the first embodiment of the invention.

Next, the detailed configuration of the write unit 500 is described in conjunction with FIG. 12.

In FIG. 12, numeral 510 is data first-in first-out (FIFO), numeral 520 is an exclusive OR circuit, numeral 530 is a switch for connecting the data bus 170 of the interface unit 100 and the FIFO 510, numeral 540 is a switch for connecting the exclusive OR circuit 520 and the FIFO 510, and numeral 550 is a switch for connecting the FIFO 510 and the bus 380 to the magnetic disk units. Numeral 560 is a switch for connecting the FIFO 510 and the exclusive OR circuit 520. Numeral 900 is a transfer bus for transferring outputs from the exclusive OR circuit 420 of the read unit shown in FIG. 9.

Next, the operation of the write unit shown in FIG. 12 is described.

To continuously write data whose transfer length is long, a spiraling data array as shown in FIG. 7 is stored in a spiraling table and the control circuit 600 references the spiraling table for writing continuous data according to the array as shown in FIG. 7. That is, the control circuit 600 references the spiraling table and transfers data in data blocks 0–3 to FIFOs 510a–510d. The exclusive OR circuit 520 inputs the data transferred to FIFOs 510a–510d and exclusive-ORs the data. The exclusive OR circuit 520, which has the circuit configuration as shown in FIG. 10, outputs the exclusive ORing result to FIFO 510e. Therefore, redundant data of data written into HDD0–HDD3 is generated in FIFO 510e in synchronization with the transfer block of the write data transferred last in FIFOs 510a–510d. The ideal timing at which the redundant data is generated in FIFO 510e is the timing delayed as long as the operation delay of the exclusive OR circuit 520 from the timing at which the data in FIFO 510a–510d is transferred last. Therefore, the time formerly required for temporarily storing write data in memory and then exclusive ORing the data to find redundant data can be saved. When data is provided in FIFO 510a–510e, the control circuit 600 turns on the switches 550 to connect the FIFOs 510 and the bus 380 to the magnetic disk units and records the data contained in FIFOs in the corresponding magnetic disk units.

Next, an operation example is described in which data is written into one data block rather than data being written continuously. For example, to write data into HDD0, it is necessary to read old data OD written so far in HDD0 and redundant data OP in the redundant group containing the old data OD. Assume that the redundant data is recorded in HDD4. To write data into HDD0, it is necessary to first read the old data OD from HDD0 and the old redundant data OP from HDD4 and generate new redundant data from the old data OD, the old redundant data OP, and new write data. The old data OD and the old redundant data OP are read by the read unit shown in FIG. 9. The read data is input to FIFOs 410a and 410e. The read data is also transferred to the exclusive OR circuit 420 which then exclusive-ORs the old data OD and the old redundant data OP and outputs the result to the transfer bus 900. The transferred data on the transfer bus is sent via the switch 560 to the exclusive OR circuit 520 of the write unit 500.

On the other hand, at the write unit 500, the new write data is input via the data bus 170 to FIF0 510a and then transferred from FIFO 510a to the exclusive OR circuit 520. The exclusive OR circuit 520 exclusive-ORs the signal resulting from exclusive ORing the OD and OP transferred on the transfer bus 900 and the new write data transferred from FIFO 510a, and outputs the resultant data via the switch 540 to FIFO 510e. Thus, new redundant data is generated in FIF0 510e at the same time as the new write data is provided in FIFO 510a. The control circuit 600 controls the switches 550 to connect FIFOs 510a and 510e to the bus 380 to the magnetic disk units, thereby recording the data in the corresponding magnetic disk units. Formerly, temporary read data and new data were exclusive-ORed to find redundant data; according to the embodiment of the invention in which the exclusive OR circuit 420 of the read unit and the exclusive OR circuit 520 of the write unit are located, new redundant data can be generated substantially at the same time as new write data is transferred, and the extra time formerly required for the exclusive OR operation can be saved.

Next, the operation of the read unit and the write unit is described for each mode in conjunction with FIGS. 13 to 25.

Figure 13:
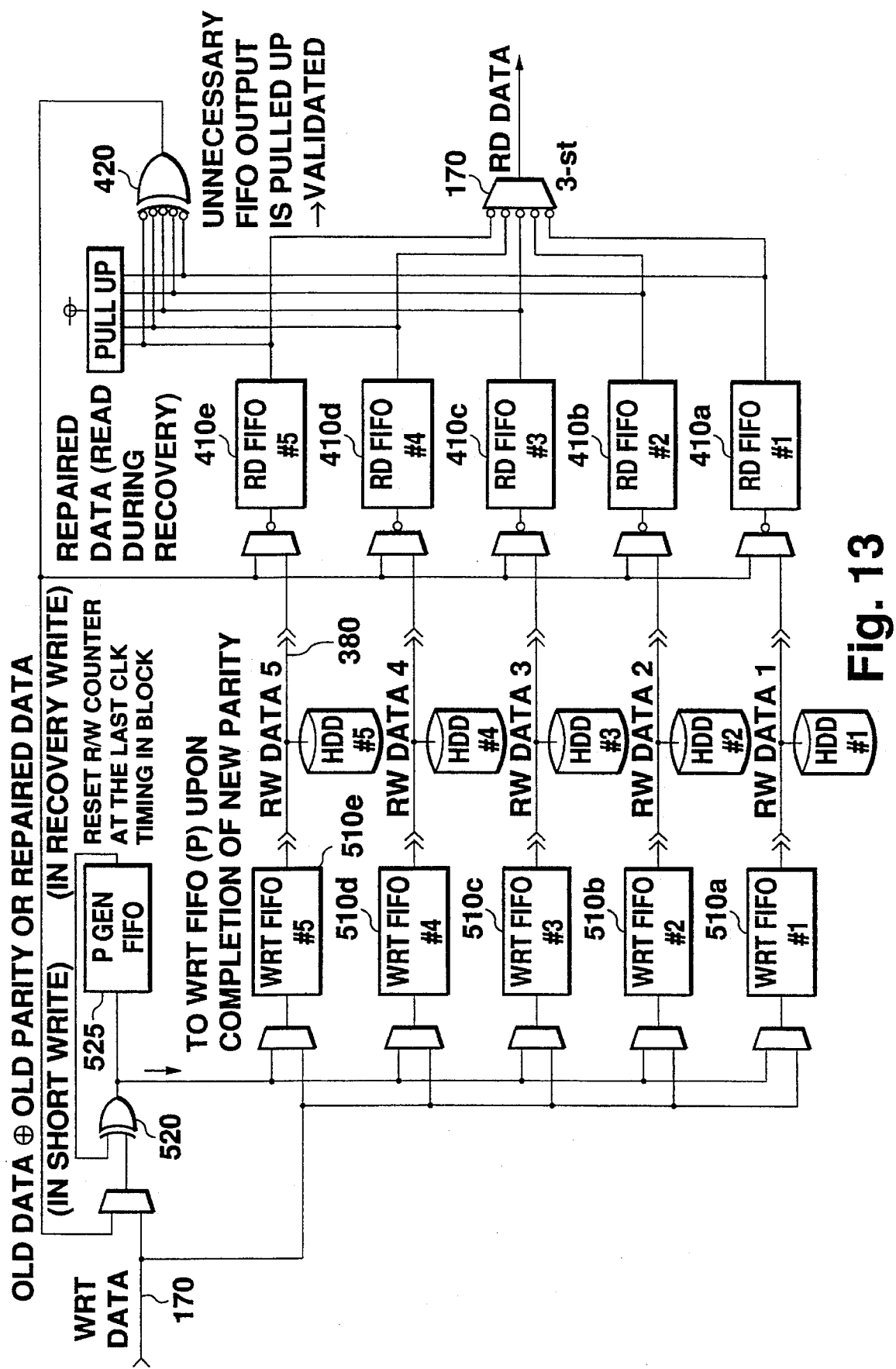

FIG. 13 shows a schematic configuration of the read unit 400 shown in FIG. 9 and the write unit 500 in FIG. 11 with magnetic disk units between. The numerals in FIG. 13 are identical with those shown in FIGS. 9 and 12 except that numeral 525 is P GEN FIFO for recording redundant data output by the exclusive OR circuit 520.

Figure 15:
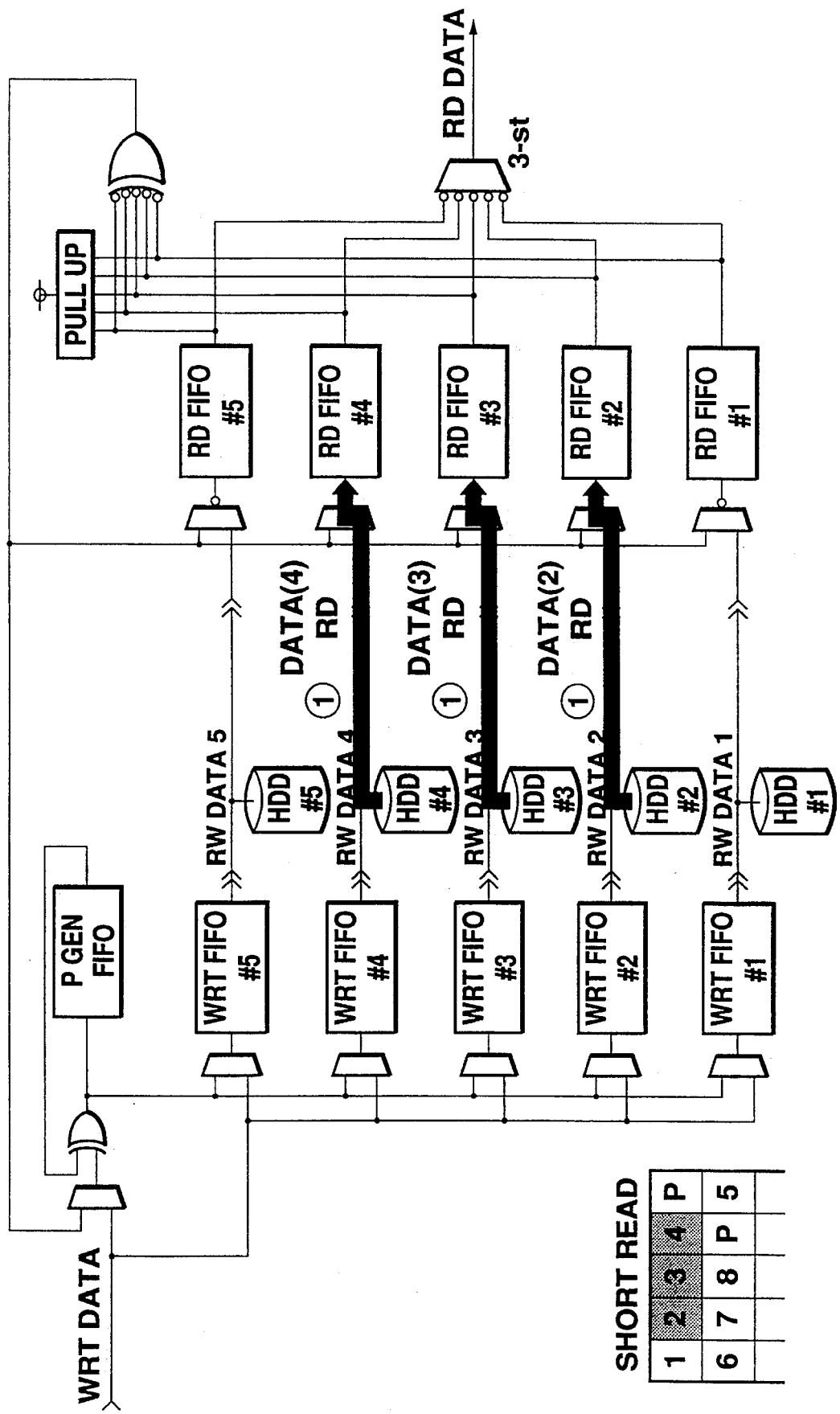
FIG. 15 is a second drawing for illustrating a short read operation according to the first embodiment of the invention.
Figure 16:
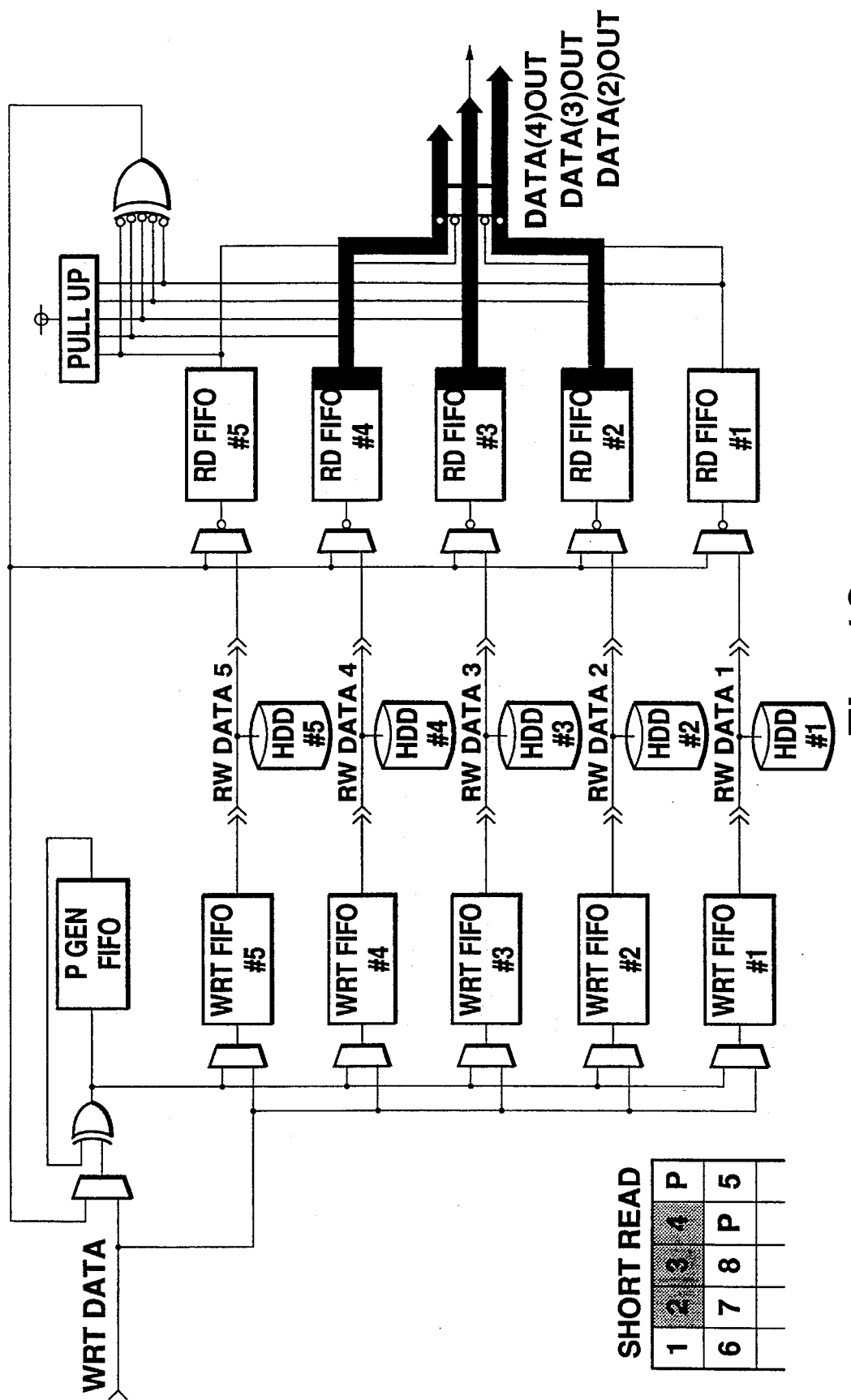
FIG. 16 is a third drawing for illustrating a short read operation according to the first embodiment of the invention.

Next, the operation of reading data from magnetic disk units is described in conjunction with FIGS. 14 to 16.

As shown in FIG. 14, data in data blocks 2–4 is read from HDD2–HDD4. To perform the read operation, as shown in FIG. 15, first, data is read from HDD2–HDD4 into RD FIFOs #2–#4. The disks can be accessed in parallel on condition that RD FIFOs #2–#4 are empty and the write address is reset. Next, when the data in data blocks 2–4 is provided in RD FIFO #2–#4, then the data in RD FIFO #2–#4 is transferred to the data bus 170 in order as shown in FIG. 16.

Next, the operation of writing data into one block is described in conjunction with FIGS. 17 to 20.

Figure 19:
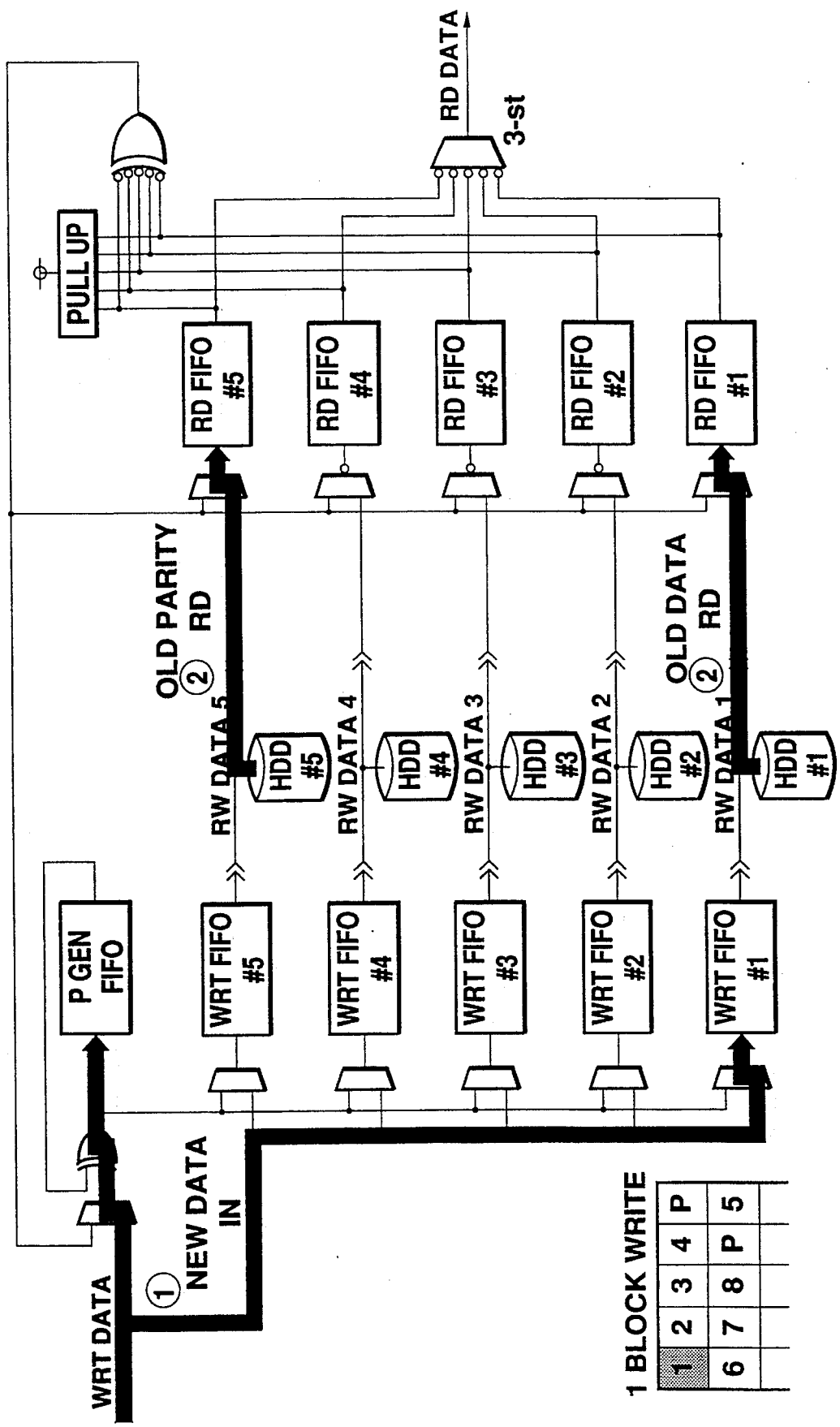
FIG. 19 is a third drawing for illustrating an 1-block write operation according to the first embodiment of the invention.

First, to write data into data block 1 of HDD1 as shown in FIG. 17, new write data is transferred to WRT FIFO #1 and P GEN FIFO 525 as shown in FIG. 19. At the same time, the corresponding data is read from HDD1 and HDD5 (assume that redundant data is recorded in HDD5) into RD FIFOs #1 and #5.

Figure 20:
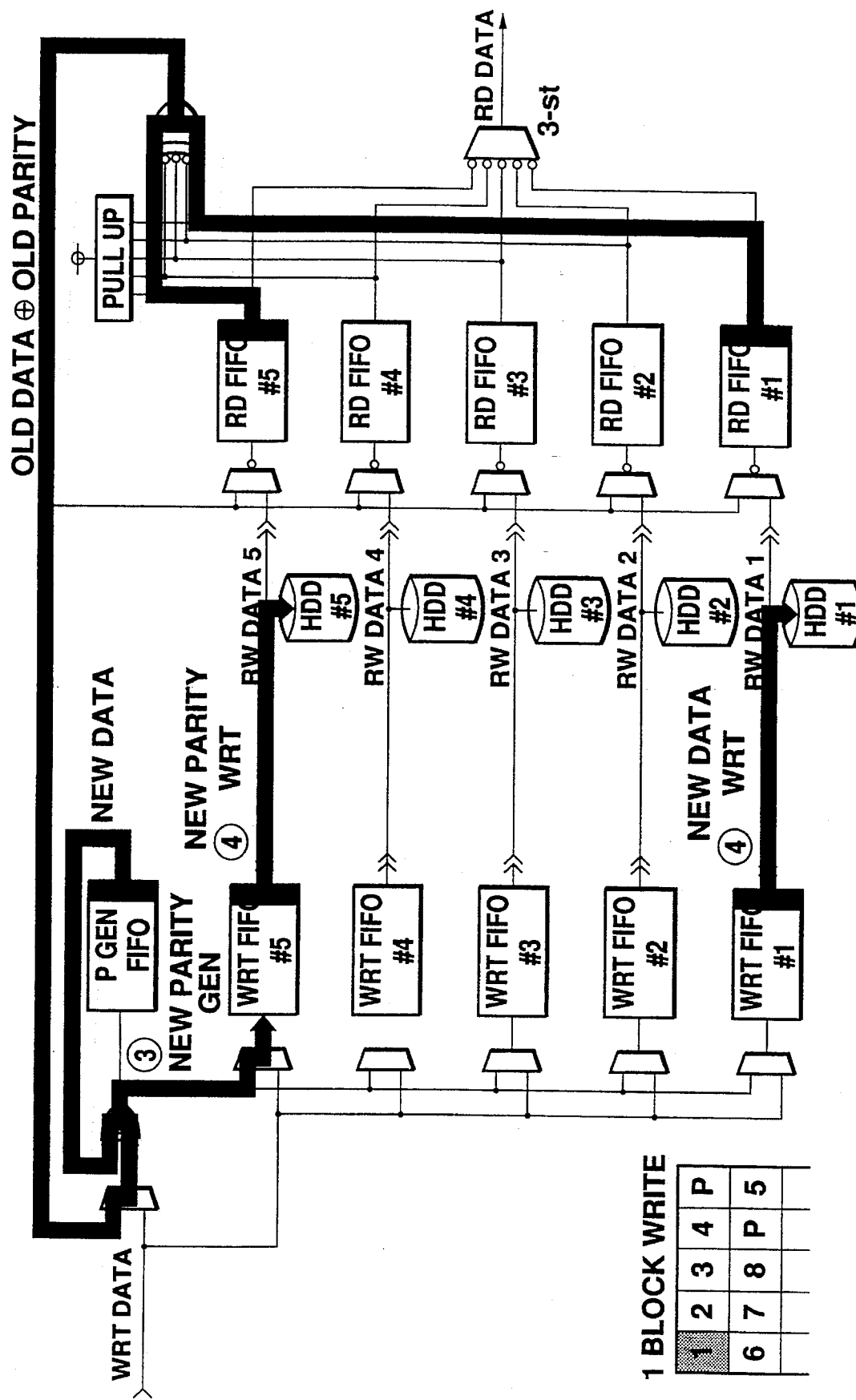
FIG. 20 is a fourth drawing for illustrating an 1-block write operation according to the first embodiment of the invention.

As shown in FIG. 20, the data read into RD FIFOs #1 and #5 is transferred via the exclusive OR circuit 420 to the exclusive OR circuit 520. At the same time as the data transfer, the new write data held in P GEN FIF0 525 is input to the exclusive OR circuit 520. Then, the exclusive OR circuit 520 exclusive-ORs the old data, old parity, and new write data, and outputs the resultant data to WRT FIFO #5. At the last step, the new write data held in WRT FIFO #1 is written into HDD1 and the data held in WRT FIF0 #5 is written into HDD5 as redundant data.

Next, the group write operation for writing one redundant group into magnetic disk units is described in conjunction with FIGS. 21 to 25.

As shown in FIG. 21, data is recorded in data blocks 1 to 4 of magnetic disk units.

Figure 23:
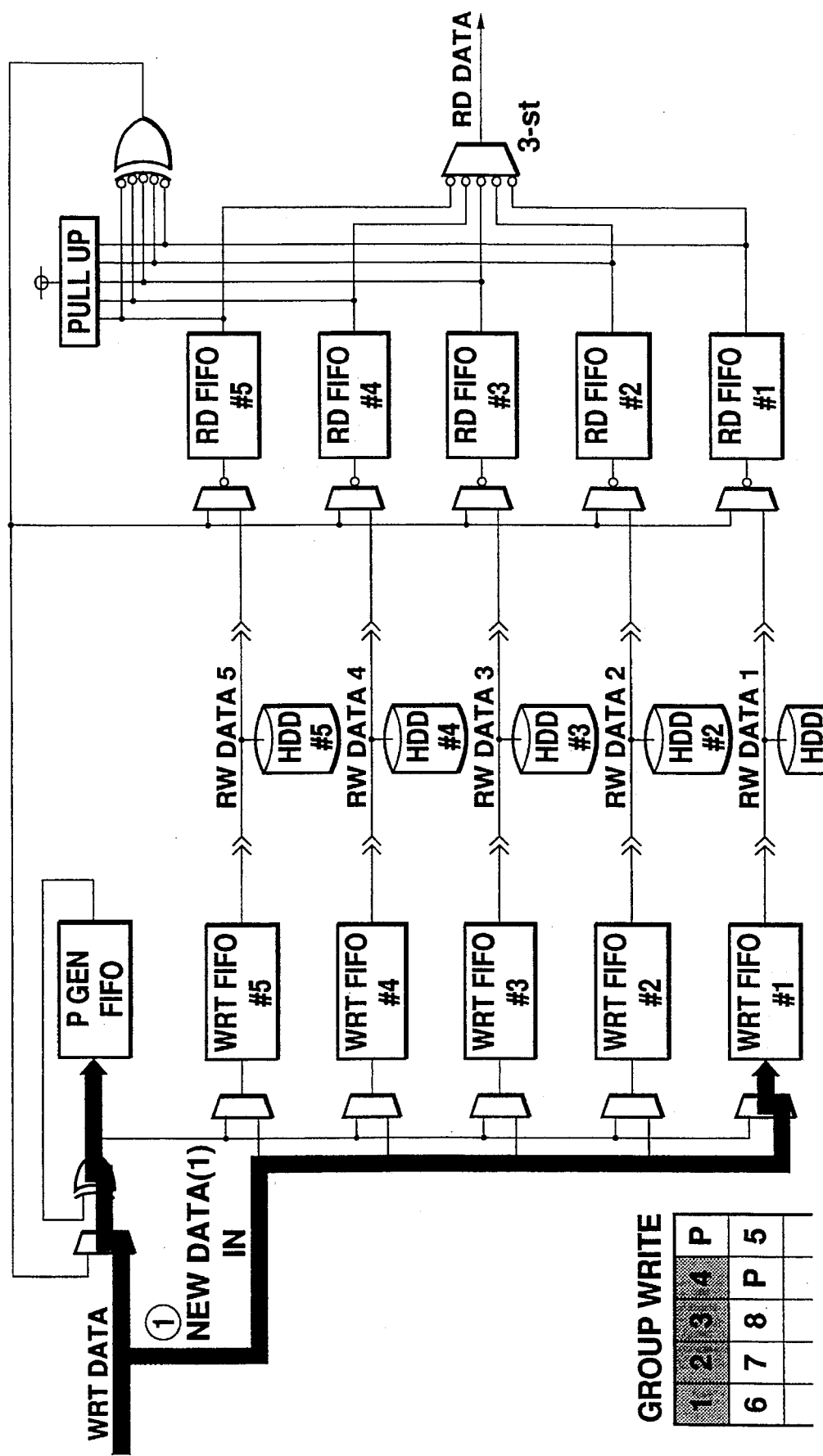
FIG. 23 is a third drawing for illustrating a group write operation according to the first embodiment of the invention.
Figure 24:
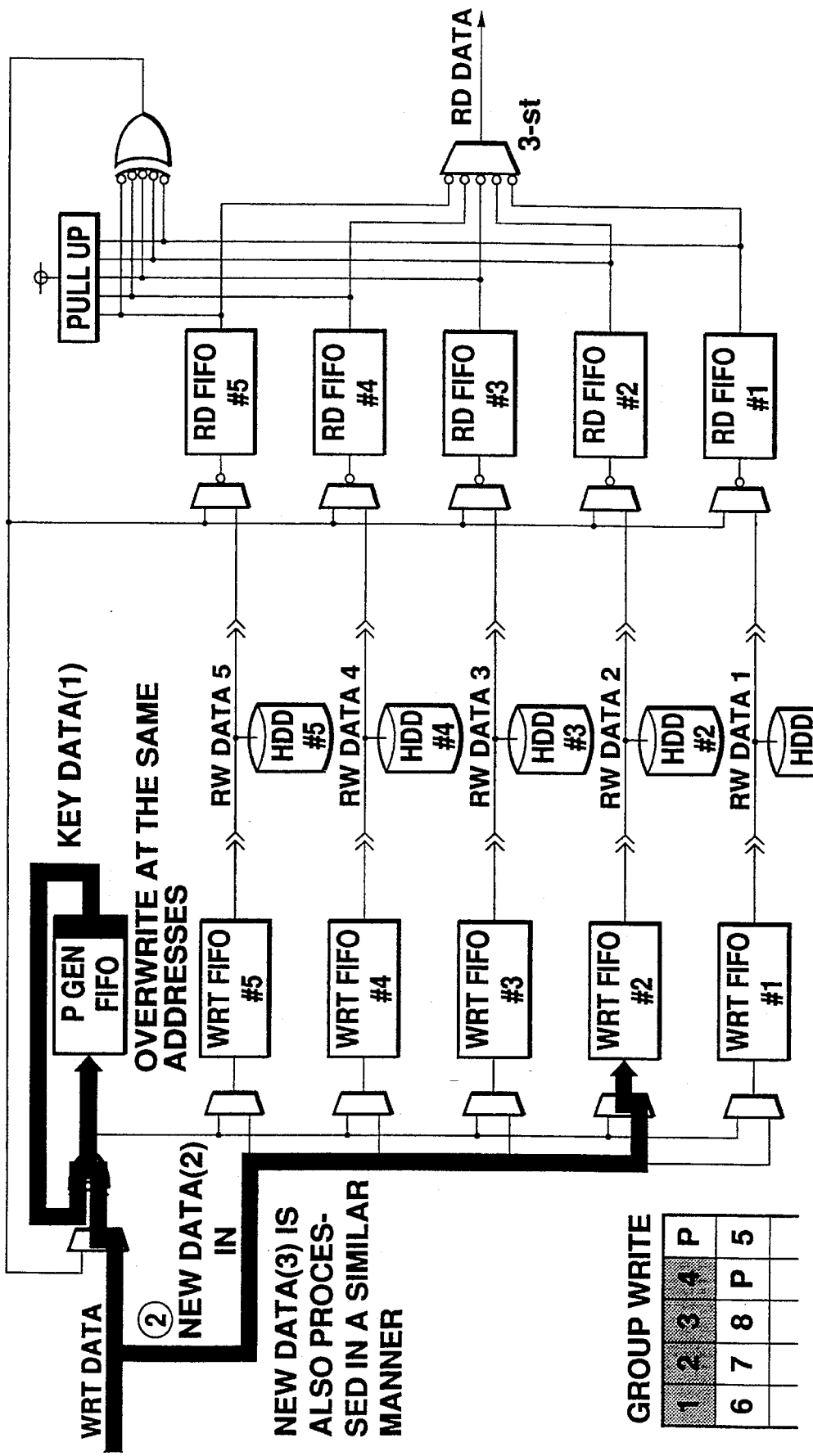
FIG. 24 is a fourth drawing for illustrating a group write operation according to the first embodiment of the invention.
Figure 25:
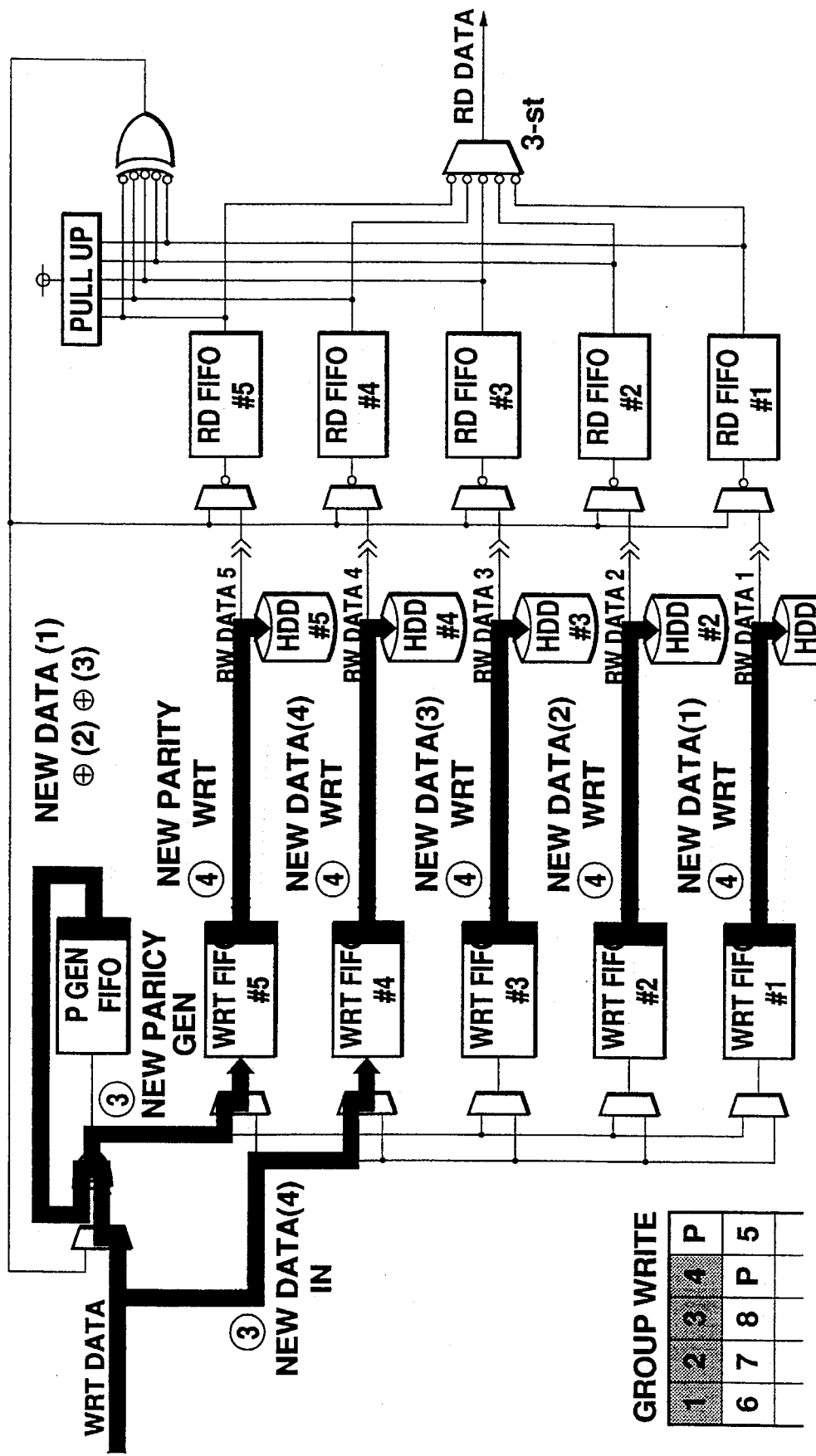
FIG. 25 is a fifth drawing for illustrating a group write operation according to the first embodiment of the invention.

First, new write data is transferred to WRT FIFO #1, as shown in FIG. 23. Likewise, new write data is transferred to WRT FIFO #2, as shown in FIG. 24; new write data to WRT FIFO #3; and new write data to WRT FIFO #4. Each time the data is input to the FIFO in order, the exclusive OR circuit 20 generates new redundant data in FIFO 525. When data is transferred to WRT FIFO #1, it is also transferred to P GEN FIF0 525. At the same time as the next data is transferred to WRT FIFO #2, this data and the data already existing in P GEN FIFO 525 are exclusive-ORed and the result is recorded in P GEN FIFO 525. After such an operation is repeated for the data written into HDD1 to the data written into HDD4, the data in the FIFOs are written into the corresponding magnetic disk units, as shown in FIG. 25.

Next, the FIFO function is described.

The FIFO is used to temporarily store data in a first-in first-out manner. Therefore, normally the data output in a first-in first-out manner does not remain in the FIFO, but in the example, the data once input to the FIFO is held in the FIFO until a command for clearing the data is received. To hold data in the FIFO, without shifting the data for output for first-in first-out, for example, a counter or the like is counted up and the data indicated by the counter is output in order, thereby accomplishing the FIFO function, or the data in the FIFO is shifted for output as formerly and the data output from the FIFO is again input to the FIFO so that the data in the FIFO cycles. Thus, the data in the FIF0 is not cleared and remains in the FIF0 and it can be retransferred.

For example, when data is written, if some fault occurs on a magnetic disk unit and the data output from the FIF0 is lost, the lost data can be recovered simply by transferring the data held in the FIF0 to the magnetic disk unit without the need for again receiving the data from the host computer, etc. This means that the write operation can be retried immediately. On the other hand, a data read is considered. After the data in the FIF0 is output to the interface unit 100, if some fault occurs on the interface unit 100, etc., and a data reread is requested, the data existing in the FIF0 may be again simply output to the interface unit 100 without the need for again reading the data from the magnetic disk unit. This means that the read operation can be retried immediately.

Figure 26:
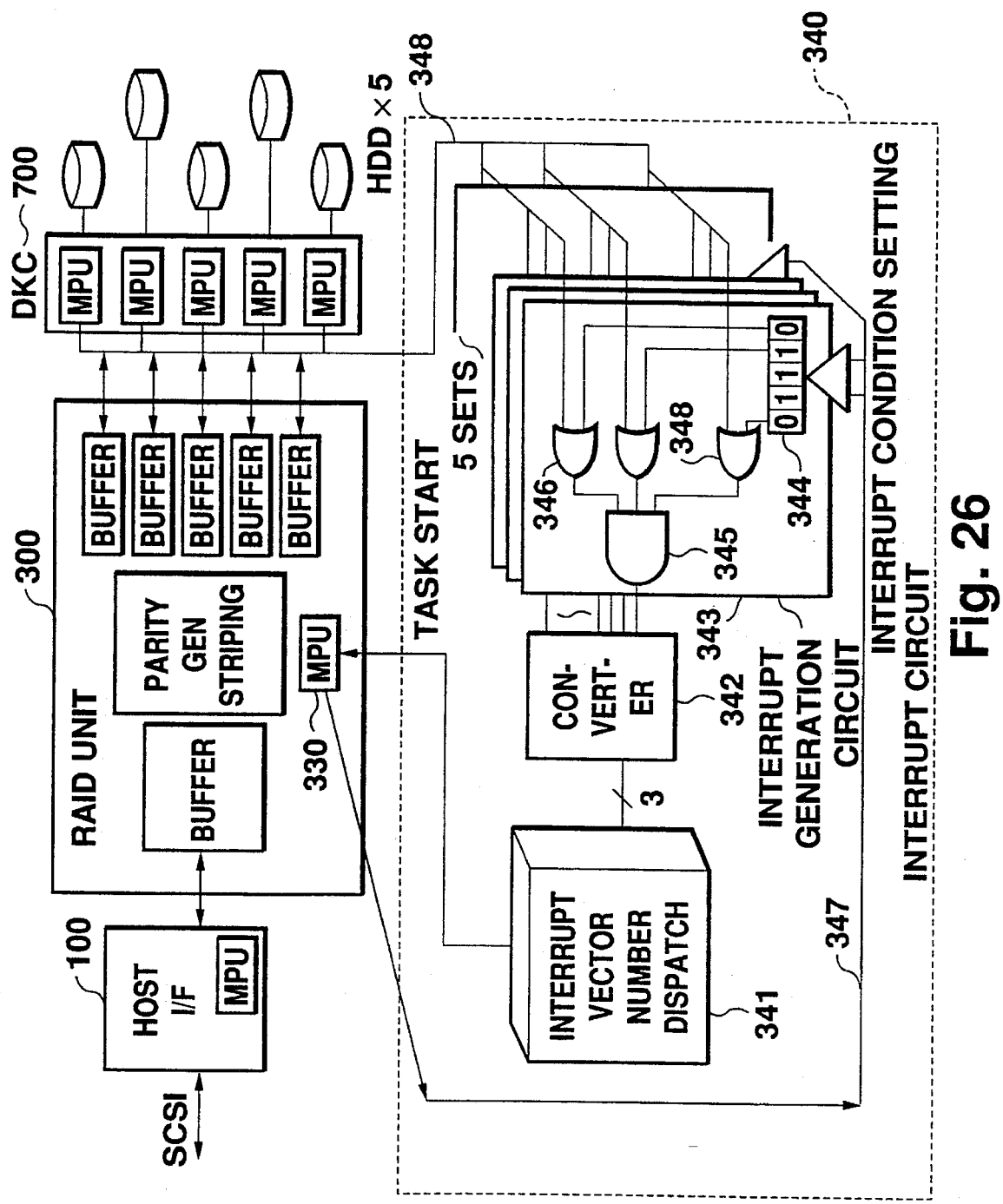
FIG. 26 is a block diagram of an interrupt circuit of the array type recording system according to the first embodiment of the invention.
Figure 28:
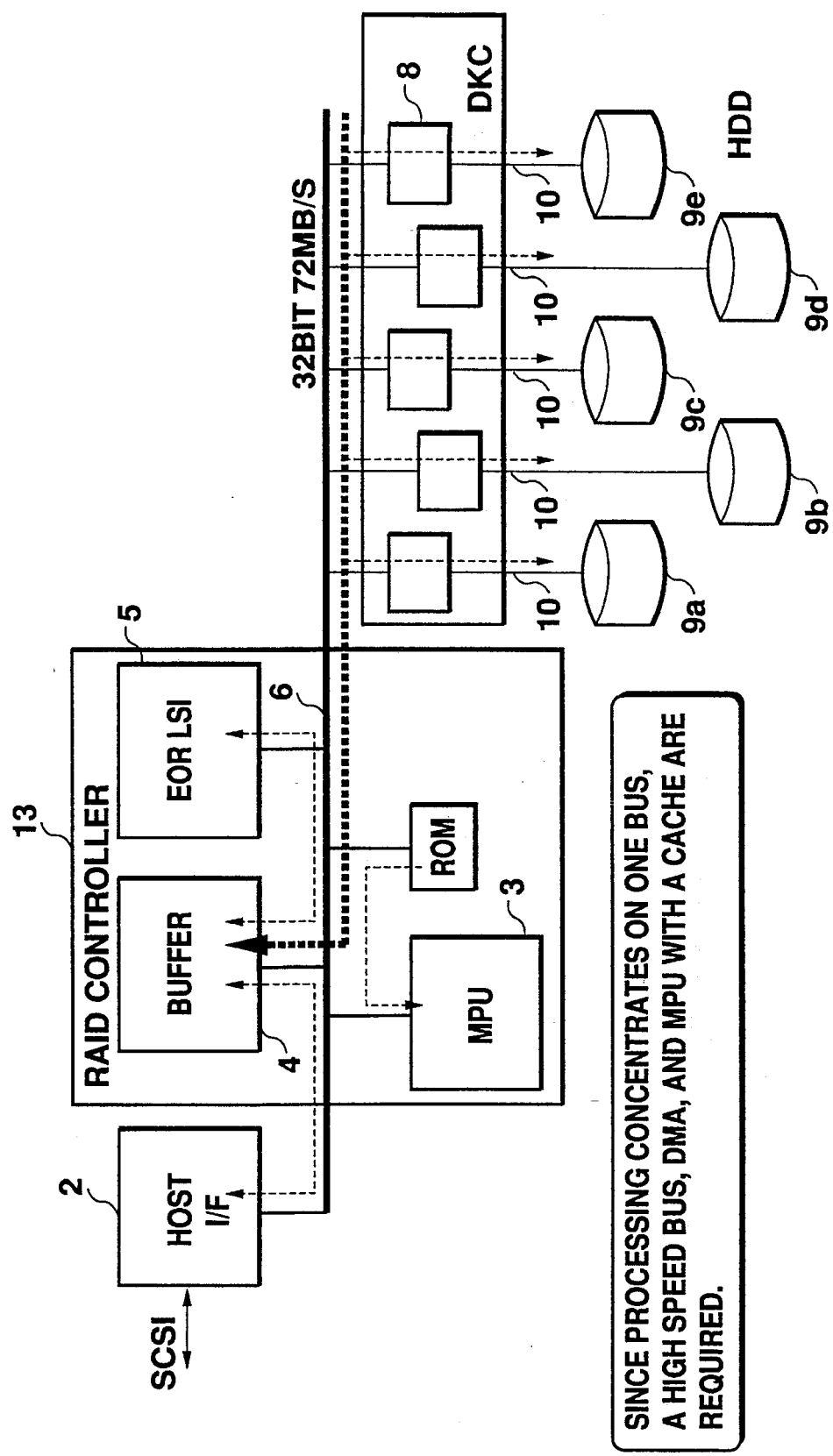
FIG. 28 is a drawing showing the configuration of a conventional array type magnetic disk drive system.
Figure 29:
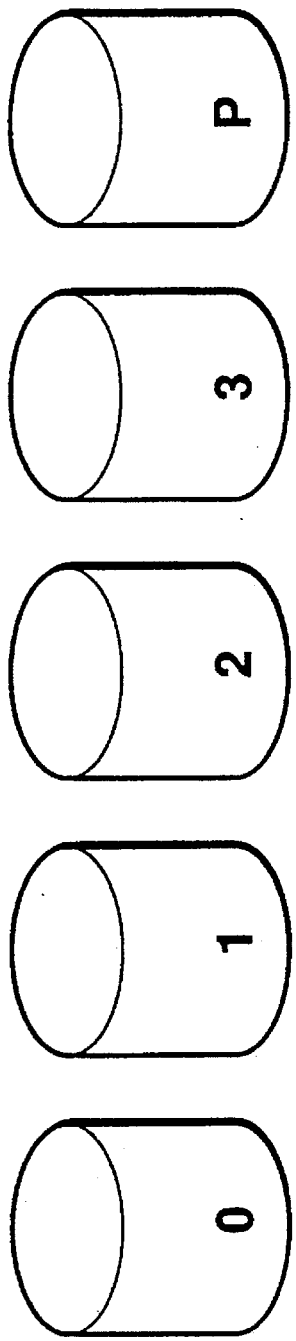
FIG. 29 is a drawing for illustrating the operation of the array type magnetic disk drive system.
Figure 30:
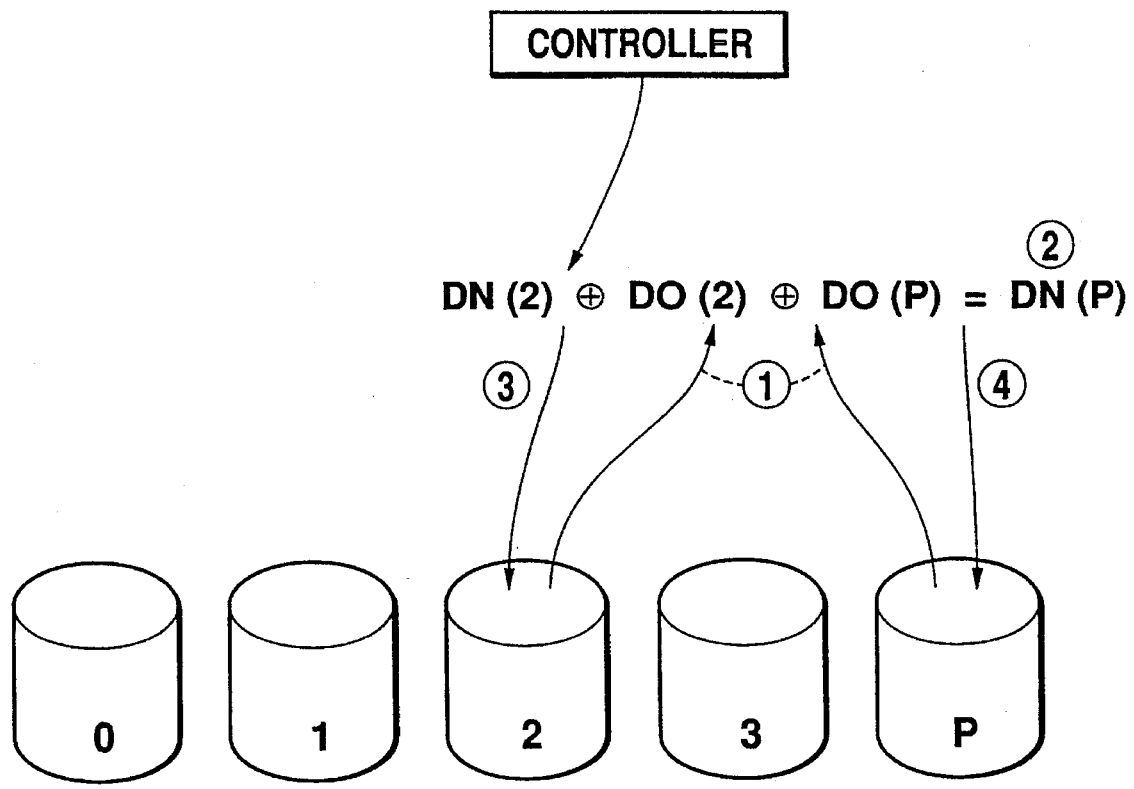
FIG. 30 is a drawing for illustrating the operation of the array type magnetic disk drive system.
Figure 31A:
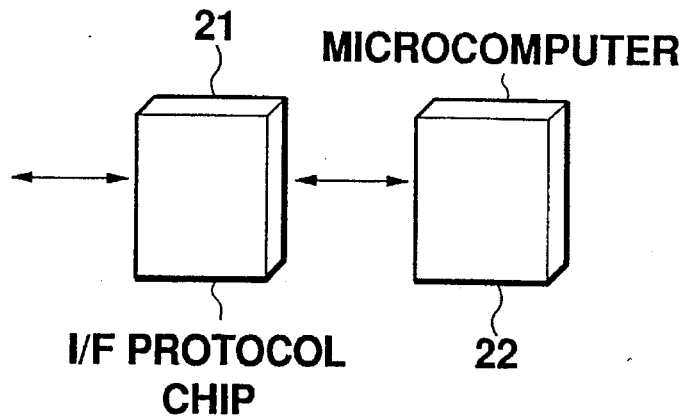
FIG. 31A is a drawing for illustrating the operation of a conventional interface unit.
Figure 31B:
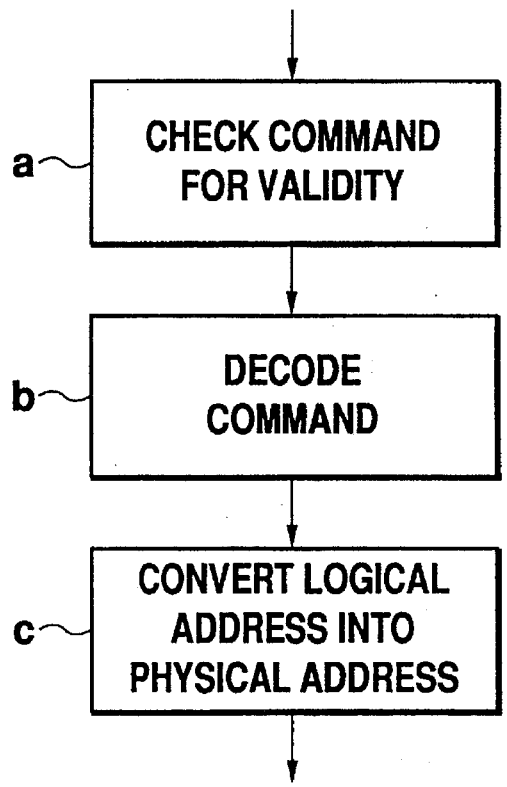
FIG. 31B is a flowchart for illustrating the operation of the conventional interface unit.

Next, the configuration of the interrupt circuit 340 shown in FIG. 5 is described in conjunction with FIG. 26.

In FIG. 26, numeral 340 is an interrupt circuit which detects operation completion of magnetic disk units and starts the processing program causing the magnetic disk units to operate. Numeral 341 is an interrupt vector number dispatch circuit which dispatches interrupt vector numbers, numeral 342 is a converter which generates interrupt vector numbers, and numeral 343 is an interrupt generation circuit which detects operation completion of magnetic disk units and generates an interrupt signal. Numeral 345 is an AND gate, numeral 346 is an OR gate, and numeral 344 is a register in which a value can be programmably set from the MPU 330.

In operation, when receiving a processing request through the host interface 100, the MPU 330 determines which disks are to be used according to the processing request, and controls the operation of the target magnetic disk units. At the same time, the MPU 330 sets a value in the register 344. For example, if the processing request indicates an access to HDD0 and HDD4, the register bits corresponding to HDD0 and HDD4 are set to 0 and the remaining bits are set to 1, as shown in FIG. 26. The magnetic disk units 800 and the HDD control unit 700, upon completion of their processing, inform the interrupt circuit 340 of the completion. In the example, when HDD0 completes processing and when HDD4 completes processing, the interrupt circuit 340 is informed of the completion. At this time, the interrupt generation circuit 343 performs operation on the value of the register 344 and completion information by the OR gates 346, and 1 is output from all OR gates to the AND gate 345 which then outputs 1. The converter 342 detects the interrupt generation circuit which goes on, converts the signal into an interrupt vector number, and then sends it to the interrupt vector number dispatch circuit 341. The interrupt vector number dispatch circuit 341 dispatches the interrupt vector number to the MPU 330 which causes control to jump to the address corresponding to the vector number, thereby starting the processing program, as shown in FIG. 27. For example, if vector number 0 is dispatched, the MPU 330 can start the processing program for task 0 located starting at address 100.

Since five sets of interrupt generation circuits 343 are provided in the example, the MPU 330 can hold up to five processing requests in the stack 350 for processing. By setting the registers 344 of the interrupt generation circuits 343 corresponding to a maximum of five processing requests, when the HDD control unit 700 informs the interrupt circuit 340 of completion of processing, the interrupt generation circuit 343 operates and the interrupt vector number dispatch circuit 341 dispatches the vector number corresponding to the processing request to the MPU 330; therefore, the task corresponding to the processing request can be automatically started from the stack 350. The interrupt circuit 340 has circuitry which generates any interrupt vector number according to the combination condition of completion reports of any HDDs, and the corresponding task can be started in response to the vector number. Therefore, to access magnetic disk units and wait for their operation completion, when the desired magnetic disk unit completes all processing, the waiting task can be automatically distinguished from other tasks for starting. The register 344 can be programmably changed by the MPU 330 and the program started in response to the interrupt vector number can also be programmably changed, thus the interrupt circuit 340 can be made very flexible. The number of magnetic disk units whose operation completion is expected or the numbers of tasks to be started corresponding to processing requests can also be programmably changed and so the system configuration can be made very flexible.

Embodiment 2

Although the number of magnetic disk units is five in the first embodiment, it is not limited and another number of magnetic disk units may be used. One or two magnetic disk units are connected to one control unit in the first embodiment, but the number of magnetic disk units connected to one control unit is not limited.

Embodiment 3

Although the dual port RAM is used in the first embodiment, any other memory having a plurality of access ports may be used in place of the dual port RAM.

Embodiment 4

Although the array type recording system comprises magnetic disk units in the first embodiment, it may comprise optical disk units, CD ROM units, semiconductor disk memories (SSDs), or the like, or the recording units used in one system may be of not only the same type, but also different types such as optical disk units and magnetic disk units.

As described above, according to the invention, there is provided the array type recording system in which overhead of read/write processing is reduced and whose performance is improved. Particularly, the redundant data generation operation can be simplified and the time required for the operation can be reduced. Also, the recovery data generation operation can be simplified and the time required for the operation can be reduced. Further, data can be handled continuously and memory transfer and data processing are not required. Further, when data is written into a number of blocks, the number of times a parity write operation is performed can be reduced. Further, read/write operation can be retried immediately.

What is claimed is:

1. An array type recording system comprising:
   (a) a plurality of recording media for recording data;
   (b) a write circuit for writing write data onto said plurality of recording media, the write circuit including:
       a write redundancy code generator, and
       a plurality of write buffers coupled to the write redundancy code generator, selectively receiving the write data to be written onto the plurality of recording media, the write redundancy code generator including a write redundancy buffer to store the write data and a write redundancy circuit, coupled to the write redundancy buffer, to provide a write redundancy code based on the write data stored in the write redundancy buffer and an intermediate code;
   (c) a read circuit for reading read data from said plurality of recording media, the read circuit including a read redundancy code generator and a plurality of read buffers coupled to the read redundancy code generator, each recording medium being coupled to a respective one of the plurality of read buffers to receive the read data and a respective one of the plurality of write buffers to write the write data, wherein the read redundancy code generator is coupled to the write redundancy code generator, to provide the intermediate code based on the read data and a read redundancy code read from the plurality of read buffers when data is to be written; and
   (d) a controller that selects a read buffer and selects a write buffer for storing the read redundancy code and the write redundancy code, respectively.

2. The array type recording system of claim 1, wherein the plurality of read buffers and the plurality of write buffers are first-in first-out buffers.

3. The array type recording system of claim 1, further comprising
   interface means for issuing a request to at least one of the read circuit and the write circuit, the interface means including:
       a command input section which inputs commands from an external system;
       a multiport memory which has a plurality of access ports and stores the commands received by the command input section; and
       a plurality of command processing sections that access the commands through the access ports of said multiport memory and that execute allotted processing portions of the commands in parallel.

4. An array type recording system comprising:
   (a) a plurality of recording media for recording data;
   (b) write means for writing a plurality of write data entries and a plurality of write redundancy codes on said plurality of recording media in a scattered manner as a plurality of continuous groups of data entries in a predetermined order and in a predetermined direction so that the plurality of write redundancy codes is located on said plurality of recording media cyclically and so that a next group of data entries begins on a recording medium having a write redundancy code associated with a preceding group of data entries, the write means including a write redundancy code generator and a plurality of write buffers coupled to the write redundancy code generator, the write redundancy code generator including a write redundancy buffer to store a write data entry, and a write redundancy circuit coupled to the write redundancy buffer, to provide a write redundant code based on the write data entry and an intermediate code when the write data entry is stored in the write redundancy buffer and further stored in the plurality of write buffers;
   (c) read means for reading the plurality of continuous groups of data entries stored on the plurality of recording media by ignoring the redundant data and reading each group of data entries on said plurality of recording media in the predetermined order and in the predetermined direction starting at the recording medium from which a read redundancy code associated with a previously read group of data entries has been read when all data entries of each group are completely read, the read means including a read redundancy code generator and a plurality of read buffers coupled to the read redundancy code generator, each recording medium being coupled to a respective one of the plurality of read buffers and a respective one of the plurality of write buffers, wherein the read redundancy code generator is coupled to the write redundancy code generator, to provide the intermediate code based on a read data entry and a read redundancy code; and (d) a controller that selects a read buffer and selects a write buffer for storing the read redundancy code and the write redundancy code, respectively.

5. The array type recording system of claim 4, wherein the read redundancy code generator includes a recovery data generation circuit which generates recovery data to recover the plurality of continuous groups of data entries when the plurality of continuous groups of data entries is unable to be read by said read means.

6. The array type recording system of claim 4, wherein the write redundancy code generator circuit is constructed and arranged to generate the intermediate code from the read data entry and the read redundancy code when the the write data entry is written onto said recording medium.

7. The array type recording system of claim 2, further comprising:

output means for outputting data from said first-in first-out buffers of the read and the write circuits, and continuously holding the data in the first-in first-out buffers so that the data may be output more than once.

8. The array type recording system of claim 1, further comprising:

a plurality of cache memories, each cache memory corresponding to one of said plurality of recording media, temporarily storing data that is at least one of read from or written to the plurality of recording media, the read circuit and the write circuit reading the data from and writing the data to said plurality of recording media through said plurality of cache memories.

9. The array type recording system of claim 1, further comprising:

a plurality of task means for issuing an access request to a desired number of recording media of said plurality of recording media and accessing the desired number of recording media;

reporting means for reporting access completion to said desired number of recording media accessed by said task means; and task start means, responsive to a combination of reports from said reporting means, for selecting one of said plurality of task means and for starting the access request.

10. The array type recording system of claim 3 further comprising:

a control bus connected to one of said plurality of access ports of said multiport memory; and a data bus connected to one of said plurality of access ports of said multiport memory.

11. The array type recording system of claim 3, wherein said plurality of command processing sections include:

a command check circuit which checks command validity;

a circuit which decodes commands; and a circuit which converts a logical address of a data store location into a physical address.

12. The array type recording system of claim 4, wherein said write means writes the plurality of continuous groups of data entries onto one recording medium at a time.

13. The array type recording system of claim 4, wherein said read means reads the plurality of continuous groups of data entries from one recording medium at a time.

14. The array type recording system of claim 2, wherein each of said first-in first-out buffers includes:

a memory which records data;

a read counter which is incremented or decremented as instructed from an external system and outputs a data read address of said memory; and a write counter which is incremented each time data is written, and outputs a data write address.

15. The array type recording system of claim 1, wherein said recording media are magnetic disks.

16. The array type recording system of 1, wherein said recording media are magneto-optic disks.

17. The array type recording system of claim 1, wherein the write redundancy code generator is adapted to simultaneously generate the write redundancy code while the write data is being written into the plurality of write buffers.

18. The array type recording system of claim 17, wherein the write redundancy circuit includes an exclusive-OR circuit having a first input to receive the write data, a second input coupled to the redundancy code generator, and an output coupled to the write redundancy buffer.

19. The array type recording system of claim 1, wherein the plurality of write buffers and the plurality of read buffers are adapted to simultaneously store data to be written to and data read from the plurality of recording media, respectively.

20. The array type recording system of claim 1, wherein the controller reads data from and writes data to the plurality of recording media by operating a plurality of switches coupled to the plurality of read buffers and the plurality of write buffers, respectively.

21. The array type recording system of claim 1, wherein each of the read redundancy code circuit and the write redundancy code circuit includes exclusive-OR circuitry that simultaneously provides the intermediate code and the write redundancy code, respectively.

22. The array type recording system of claim 4, wherein the write redundancy code generator is adapted to simultaneously generate the write redundancy code while the write data is being written into the plurality of write buffers.

23. The array type recording system of claim 22, wherein the write redundancy circuit includes an exclusive-OR circuit having a first input to receive the write data, a second input coupled to the redundancy code generator, and an output coupled to the write redundancy buffer.

24. The array type recording system of claim 4, wherein the plurality of write buffers and the plurality of read buffers are adapted to simultaneously store data to be written to and data read from the plurality of recording media, respectively.

25. The array type recording system of claim 4, wherein the controller reads data from and writes data to the plurality of recording media by operating a plurality of switches coupled to the plurality of read buffers and the plurality of write buffers, respectively.

26. The array type recording system of claim 4, wherein each of the read redundancy code circuit and the write redundancy code circuit includes exclusive-OR circuitry that simultaneously provides the intermediate code and the write redundancy code, respectively.

27. A method for operating an array type recording system, the method comprising the steps of:

(A) writing new data into at least one of a plurality of write buffers and simultaneously writing the new data into a write redundancy code buffer;

(B) generating a write redundancy code according to the new data written in the write redundancy code buffer;

(C) writing the write redundancy code in one of the plurality of write buffers that is different from the at least one of the plurality of write buffers; and (D) storing the new data and the write redundancy code on a plurality of storage devices.

28. The method of claim 27, further comprising the step of:

simultaneously with step (A), reading old data and a read redundancy code from the plurality of storage devices into a plurality of read buffers, and generating an intermediate code according to the old data and the read redundancy code.

29. The method of claim 28, wherein step (B) includes a step of generating the write redundancy code according to the new data and the intermediate code.

30. The method of claim 27, wherein each of steps (A), (B) and (C) includes the step of:

operating a plurality of switches coupled to the plurality of write buffers to control access to and from the plurality of write buffers.

31. An apparatus for storing data, comprising:

a plurality of storage media;

a plurality of write buffers coupled to the storage media, each write buffer being associated with a respective storage medium;

a plurality of read buffers coupled to the storage media, each read buffer being associated with a respective storage medium;

a write code generator buffer; and means coupled to the write code generator buffer, for simultaneously storing data in the plurality of write buffers and the write code generator buffer such that a write redundancy code is generated from the data stored in the write code generator buffer and an intermediate code from read data and a read redundancy code read into the plurality of read buffers from the plurality of storage media.

32. The apparatus of claim 31, further comprising:

means for generating the intermediate code from the the read data and the read redundancy code.

* * * * *